US012096198B2

(12) United States Patent
Starnes et al.

(10) Patent No.: US 12,096,198 B2
(45) Date of Patent: Sep. 17, 2024

(54) ACTUATOR MODULES WITH REDUCED STIFFNESS CONNECTIONS TO PANELS AND MOBILE DEVICES INCLUDING THE SAME

(71) Applicant: Google LLC, Mountain View, CA (US)

(72) Inventors: Mark William Starnes, Sunnyvale, CA (US); Andrew Phillis, Campbell, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/634,029

(22) PCT Filed: Dec. 7, 2020

(86) PCT No.: PCT/US2020/063574
§ 371 (c)(1),
(2) Date: Feb. 9, 2022

(87) PCT Pub. No.: WO2021/118920
PCT Pub. Date: Jun. 17, 2021

(65) Prior Publication Data
US 2022/0303692 A1 Sep. 22, 2022

Related U.S. Application Data

(60) Provisional application No. 62/948,195, filed on Dec. 13, 2019.

(51) Int. Cl.
*H04R 9/06* (2006.01)
*B06B 1/04* (2006.01)
(Continued)

(52) U.S. Cl.
CPC .............. *H04R 9/066* (2013.01); *G06F 1/163* (2013.01); *H04M 1/026* (2013.01); *H04R 1/028* (2013.01);
(Continued)

(58) Field of Classification Search
CPC . H04R 9/066; H04R 3/00; H04R 7/04; H04R 9/025; H04R 9/047; H04R 2400/07;
(Continued)

(56) References Cited

U.S. PATENT DOCUMENTS 5,896,076 A 4/1999 Van Namen
6,208,237 B1 3/2001 Saiki et al.
(Continued)

FOREIGN PATENT DOCUMENTS

CN 101964579 2/2011
CN 205142501 4/2016
(Continued)

OTHER PUBLICATIONS

International Preliminary Report on Patentability in International Appln. No. PCT/US2020/063574, dated Jun. 23, 2022, 16 pages.
(Continued)

*Primary Examiner* — Carolyn R Edwards
*Assistant Examiner* — Kuassi A Ganmavo
(74) *Attorney, Agent, or Firm* — Fish & Richardson P.C.

(57) ABSTRACT

A panel audio loudspeaker includes an actuator module. The actuator module includes an intermediate layer. The intermediate layer has a voice coil connected to the intermediate layer at a first surface. The actuator module includes a magnet assembly including a plurality of magnets. At least one pair of magnets are separated by an air gap. The actuator module includes a frame connected to the intermediate layer at the first surface, one or more springs connected to the frame and suspending the magnet assembly relative to the frame so that the voice coil extends at least partially into the air gap, and a spacer connected along a portion of the intermediate layer at a second surface of the intermediate layer opposite the first surface. A stiffness of the spacer at a
(Continued)

region of connection to the intermediate layer is less than a stiffness of the intermediate layer at the connection portion.

18 Claims, 14 Drawing Sheets

(51) Int. Cl.
 G06F 1/16 (2006.01)
 H04M 1/02 (2006.01)
 H04M 1/03 (2006.01)
 H04R 1/02 (2006.01)
 H04R 3/00 (2006.01)
 H04R 7/04 (2006.01)
 H04R 9/02 (2006.01)
 H04R 9/04 (2006.01)
 H04R 11/02 (2006.01)

(52) U.S. Cl.
 CPC ............... *H04R 3/00* (2013.01); *H04R 7/04* (2013.01); *H04R 9/025* (2013.01); *H04R 9/047* (2013.01); *B06B 1/045* (2013.01); *H04M 1/03* (2013.01); *H04R 11/02* (2013.01); *H04R 2400/03* (2013.01); *H04R 2400/07* (2013.01); *H04R 2400/11* (2013.01); *H04R 2499/11* (2013.01); *H04R 2499/15* (2013.01)

(58) Field of Classification Search
 CPC . H04R 2400/11; H04R 2499/15; G06F 1/163; H04M 1/026; B06B 1/045
 See application file for complete search history.

(56) References Cited

U.S. PATENT DOCUMENTS

| | | | |
|---|---|---|---|
| 10,080,081 B1 | 9/2018 | Zhang | |
| 10,216,231 B1* | 2/2019 | Landick | B06B 1/045 |
| 2006/0115107 A1 | 6/2006 | Vincent et al. | |
| 2008/0055277 A1* | 3/2008 | Takenaka | G06F 3/016 345/177 |
| 2009/0316943 A1* | 12/2009 | Frigola Munoz | H04R 9/066 381/337 |
| 2012/0082317 A1* | 4/2012 | Pance | H04R 7/045 381/59 |
| 2012/0170792 A1 | 7/2012 | Li et al. | |
| 2013/0064401 A1* | 3/2013 | Wang | G06F 3/016 381/191 |
| 2014/0185839 A1 | 7/2014 | Hashimoto et al. | |
| 2015/0304745 A1* | 10/2015 | Fromel | H04R 7/045 381/162 |
| 2015/0373458 A1* | 12/2015 | Newlove | H04R 9/066 381/400 |
| 2016/0212547 A1* | 7/2016 | Kang | H04R 9/025 |
| 2017/0245057 A1 | 8/2017 | Grazian et al. | |
| 2017/0311063 A1* | 10/2017 | Lee | H04R 29/00 |
| 2018/0297075 A1 | 10/2018 | Ling et al. | |
| 2020/0127547 A1* | 4/2020 | Takahashi | H02K 33/18 |
| 2020/0412220 A1* | 12/2020 | Yan | H02K 33/16 |
| 2021/0174044 A1* | 6/2021 | Jo | H05K 9/0024 |
| 2021/0265554 A1* | 8/2021 | Kim | H10N 60/0576 |
| 2022/0272457 A1 | 8/2022 | Harris et al. | |
| 2024/0040320 A1 | 2/2024 | Harris et al. | |

FOREIGN PATENT DOCUMENTS

| | | |
|---|---|---|
| CN | 205792135 | 12/2016 |
| CN | 108605185 | 9/2018 |
| CN | 110401744 | 11/2019 |
| EP | 0845920 | 6/1998 |
| JP | 2002-219412 | 8/2002 |
| JP | 2002336786 | 11/2002 |
| JP | 2009-171063 | 7/2009 |
| WO | WO 2007/045908 | 4/2007 |
| WO | WO 2021/019195 | 2/2021 |

OTHER PUBLICATIONS

International Preliminary Report on Patentability International Appln. No. PCT/GB2019/052146, dated Feb. 1, 2022, 7 pages.
International Search Report and Written Opinion in International Appln. No. PCT/GB2019/052146, dated Apr. 15, 2020, 10 pages.
International Search Report and Written Opinion in International Appln. No. PCT/US2020/063574, dated May 11, 2021, 23 pages.
Office Action in Chinese Appln. No. 201980099009.3, mailed on Jan. 25, 2024, 11 pages (with English translation).
Office Action in European Appln. No. 20845246.6, mailed on Nov. 16, 2023, 8 pages.
Jinshan, "Study on Drive Control of Linear Electromagnetic Actuator," Master's Thesis, Chongqing University, Mar. 15, 2017, 1 page (English abstract only).
Office Action in Chinese Appln. No. 201980099009.3, mailed on Oct. 9, 2023, 19 pages (with English translation).
Office Action in European Appln. No. 19750148.9, mailed on Nov. 10, 2023, 4 pages.
Shahosseini et al., "Optimization and Microfabrication of High Performance Silicon-Based MEMS Microspeaker," IEEE Sensors Journal, Aug. 23, 2012, 13(1):273-284.

* cited by examiner

ACTUATOR MODULES WITH REDUCED STIFFNESS CONNECTIONS TO PANELS AND MOBILE DEVICES INCLUDING THE SAME

CROSS-REFERENCE TO RELATED APPLICATION

This application is a National Stage Application under 35 U.S.C. § 371 and claims the benefit of International Application No. PCT/US2020/063574, filed Dec. 7, 2020, which claims the benefit of U.S. Application No. 62/948,195, filed Dec. 13, 2019, which is incorporated by reference in its entirety.

BACKGROUND

Many conventional loudspeakers produce sound by inducing piston-like motion in a diaphragm. Panel audio loudspeakers, such as distributed mode loudspeakers (DMLs), in contrast, operate by inducing uniformly distributed vibration modes in a panel through an electro-acoustic actuator. The actuator can be an electromagnetic actuator that includes one or more magnets and a voice coil positioned in the magnetic field of the one or more magnets. The one or more magnets can move relative to the voice coil to transfer a force to the panel of the panel audio loudspeaker.

SUMMARY

Disclosed are actuator modules having reduced stiffness connections between a panel of a panel audio loudspeaker and components of the actuator module e.g., a coil. In some examples, the reduced stiffness connection is between the panel of the panel audio loudspeaker and an intermediate layer of the actuator that is positioned between the coil and the panel. The disclosed actuator modules can also have reduced stiffness connections between the coil and certain massive components of the transducer, e.g., a frame of the transducer. For example, the reduced stiffness connection can be realized by including a spacer that is positioned between the coil and the panel, allowing the coil to transfer most or all of its kinetic energy to the panel rather than to both the panel and the adjacent, massive transducer components such as the transducer chassis and cover.

As another example, the spacer can be surrounded by a ring of compliant material that is positioned between the panel and certain components of the actuator module other than the coil. The compliant material can allow the certain components to couple weakly to the panel through the ring of compliant material. In this way, the influence of the mass of the actuator on the movement of the panel can be reduced. For example the influence of the mass of the actuator on the movement of the panel can be reduced relative to an actuator that has a ring of stiff material between the actuator components and the panel.

As yet another example, the reduced stiffness connection can be realized by reducing the amount of intermediate layer material that connects the coil to other, massive parts of the transducer. For example, a portion of the intermediate layer can be removed. The portion of the intermediate layer that is removed can be shaped to allow the coil to pass through the removed portion. In this way, coupling of the coil to certain massive components of the transducer can be reduced.

The disclosed actuators may be suitable for panel audio loudspeakers. For example, the disclosed actuators may be suitable for panel audio loudspeakers incorporated in mobile devices, e.g., mobile phones, and in wearable devices, e.g., smart watches or head-mounted displays.

In general, one innovative aspect of the subject matter described in this specification can be embodied in a panel audio loudspeaker including an actuator module. The actuator module includes an intermediate layer extending in a plane, the intermediate layer having a first surface, a voice coil connected to the intermediate layer at the first surface, the voice coil defining a coil axis perpendicular to the plane, a magnet assembly including a plurality of magnets. At least one pair of magnets of the plurality of magnets are separated by an air gap. The panel audio loudspeaker includes a frame connected to the intermediate layer at the first surface, one or more springs connected to the frame and suspending the magnet assembly relative to the frame and intermediate layer so that the voice coil extends at least partially into the air gap, and a spacer connected along a portion of the intermediate layer at a second surface of the intermediate layer opposite the first surface, where a stiffness of the spacer at a region of connection to the intermediate layer is less than a stiffness of the intermediate layer at the portion of the intermediate layer; and a panel attached to the spacer.

In some implementations a panel audio loudspeaker includes an actuator module. The actuator module may include an intermediate layer. The intermediate layer may have a voice coil connected to the intermediate layer at a first surface. The actuator module may include a magnet assembly including a plurality of magnets. At least one pair of magnets may be separated by an air gap. The actuator module may include a frame connected to the intermediate layer at the first surface, one or more springs connected to the frame and suspending the magnet assembly relative to the frame so that the voice coil extends at least partially into the air gap, and a spacer connected along a portion of the intermediate layer at a second surface of the intermediate layer opposite the first surface. A stiffness of the spacer at a region of connection to the intermediate layer may be less than a stiffness of the intermediate layer at the connection portion.

The foregoing and other embodiments can each optionally include one or more of the following features, alone or in combination.

In some implementations, the plurality of magnets may define the air gap.

In some implementations, the voice coil has a footprint perpendicular to the plane that is substantially the same shape as a footprint of the spacer perpendicular to the plane.

In some implementations, the voice coil has a footprint perpendicular to the plane that is the same shape as a footprint of the spacer perpendicular to the plane.

In some implementations, the voice coil is aligned with the spacer at the portion of the intermediate layer to which the spacer is connected.

In some implementations, the intermediate layer includes a printed circuit board, a base-plate, and a pressure sensitive adhesive.

In some implementations, the actuator module further includes a ring of compliant material attached to the panel at a first surface and to the second surface of the intermediate layer.

In some implementations, the ring of compliant material is parallel to the plane and coplanar with the spacer. The ring of compliant material surrounds the spacer.

In some implementations, the ring of compliant material is aligned with the frame or aligned with the frame and one or more magnets of the magnet assembly.

In some implementations, the panel includes a display panel.

In some implementations, the intermediate layer includes an aperture that is aligned with the voice coil.

In some implementations, the aperture is c-shaped.

In some implementations, the aperture is o-shaped.

In some implementations, the panel audio loudspeaker further includes a supporting member attached to the actuator module.

In some implementations, the supporting member is attached to at least one of the plurality of magnets of the actuator module.

In some implementations, the panel audio loudspeaker further includes a hood enclosing the magnet assembly and the voice coil in a space defined by the hood and the intermediate layer. The supporting member is attached to the hood.

In general, another innovative aspect of the subject matter described in this specification can be embodied in a mobile device or a wearable device. The mobile device or wearable device includes a housing and a panel audio loudspeaker. The panel audio loudspeaker includes an actuator module including: an intermediate layer extending in a plane, the intermediate layer having a first surface, a voice coil connected to the intermediate layer at the first surface, the voice coil defining a coil axis perpendicular to the plane, a magnet assembly including a plurality of magnets. At least one pair of magnets of the plurality of magnets are separated by an air gap. The panel audio loudspeaker includes a frame connected to the intermediate layer at the first surface, one or more springs connected to the frame and suspending the magnet assembly relative to the frame and intermediate layer so that the voice coil extends at least partially into the air gap, and a spacer connected along a portion of the intermediate layer at a second surface of the intermediate layer opposite the first surface, where a stiffness of the spacer at a region of connection to the intermediate layer is less than a stiffness of the intermediate layer at the portion of the intermediate layer, and a panel attached to the spacer; and an electronic control module electrically coupled to the voice coil and programmed to energize the voice coil to couple vibrations to the panel to produce an audio response from the panel.

In general, another innovative aspect of the subject matter described in this specification can be embodied in a mobile device or a wearable device. The mobile device or wearable device includes a housing and a panel audio loudspeaker as described anywhere herein; and an electronic control module electrically coupled to the voice coil and programmed to energize the voice coil to couple vibrations to the panel to produce an audio response from the panel.

In some implementations, the mobile device is a mobile phone or a tablet computer.

In some implementations, the wearable device is a smart watch or a head-mounted display.

Among other advantages, embodiments include actuator modules with modified connections to the panel of a panel audio loudspeaker as compared to conventional actuator modules connected by conventional means. The disclosed actuator modules and connection means allow the panel to vibrate at a greater velocity than would a panel to which a conventional actuator module is connected by conventional means. An increase in the panel velocity can result in an increase in the sound pressure level (SPL) of the audio produced by the panel. Accordingly, another advantage of the disclosed actuator modules and connection means is that they can allow for louder panel audio loudspeakers, as compared to loudspeakers that are driven by conventional actuator modules connected to a panel by conventional means. The increase in gain provided by the disclosed actuator modules can be more pronounced at high frequencies e.g., between 5 kHz and 20 kHz.

Other advantages will be evident from the description, drawings, and claims.

BRIEF DESCRIPTION OF THE DRAWINGS

Like reference symbols in the various drawings indicate like elements.

DETAILED DESCRIPTION

Figure 1:
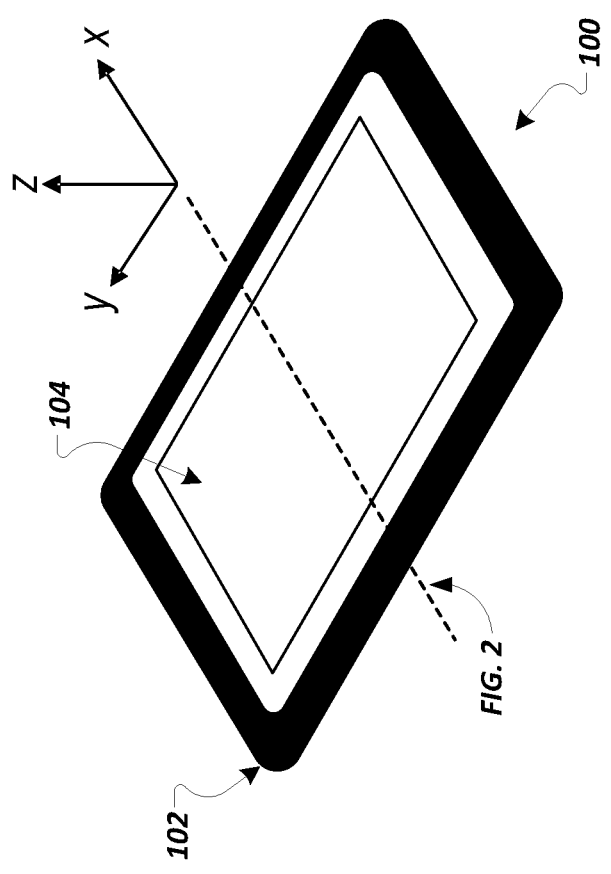
FIG. 1 is a perspective view of an embodiment of a mobile device that includes a panel.

The disclosure features actuators for panel audio loudspeakers, such as distributed mode loudspeakers (DMLs). Such loudspeakers can be integrated into a mobile device, such as a mobile phone. For example, referring to FIG. 1, a mobile device 100 includes a device housing, or chassis 102, and a touch display panel 104 including a flat panel display (e.g., an OLED or LCD display panel) that integrates a panel audio loudspeaker. FIG. 1 also includes a Cartesian coordinate system with x, y, and z axes, for ease of reference. Mobile device 100 interfaces with a user in a variety of ways, including by displaying images and receiving touch input via touch display panel 104, or simply panel 104. Typically, a mobile device has a depth (in the z-direction) of approximately 10 mm or less, a width (in the x-direction) of 60 mm to 80 mm (e.g., 68 mm to 72 mm), and a height (in the y-direction) of 100 mm to 160 mm (e.g., 138 mm to 144 mm).

Mobile device 100 also produces audio output. The audio output is generated using a panel audio loudspeaker that creates sound by causing the flat panel display to vibrate. The display is connected to an actuator, such as a distributed mode actuator, or DMA; or electromagnetic actuator. The actuator is a movable component arranged to provide a force to a panel, such as panel 104, causing the panel to vibrate. The vibrating panel generates sound waves, including those in the human audible range e.g., in the range of 20 Hz to 20 kHz.

Figure 2:
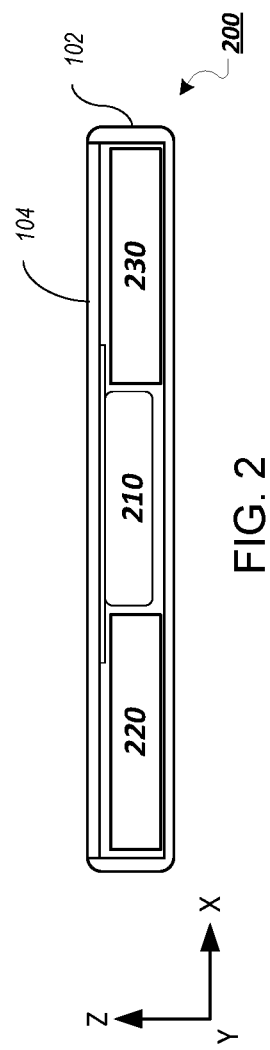
FIG. 2 is a schematic cross-sectional view of the mobile device of FIG. 1.

FIG. 1 also shows a dashed line that corresponds to the cross-sectional direction shown in FIG. 2. Referring to FIG. 2, a cross-section of mobile device 100 illustrates device chassis 102 and touch display panel 104. Device chassis 102 has a depth measured along the z-direction and a width measured along the x-direction. Device chassis 102 also has a back panel, which is formed by the portion of device chassis 102 that extends primarily in the xy-plane. Mobile device 100 includes an actuator 210, which is housed behind panel 104 in chassis 102 and connected to the back side of panel 104. Generally, actuator 210 is sized to fit within a volume constrained by other components housed in the chassis, including an electronic control module 220 and a battery 230.

Figure 3:
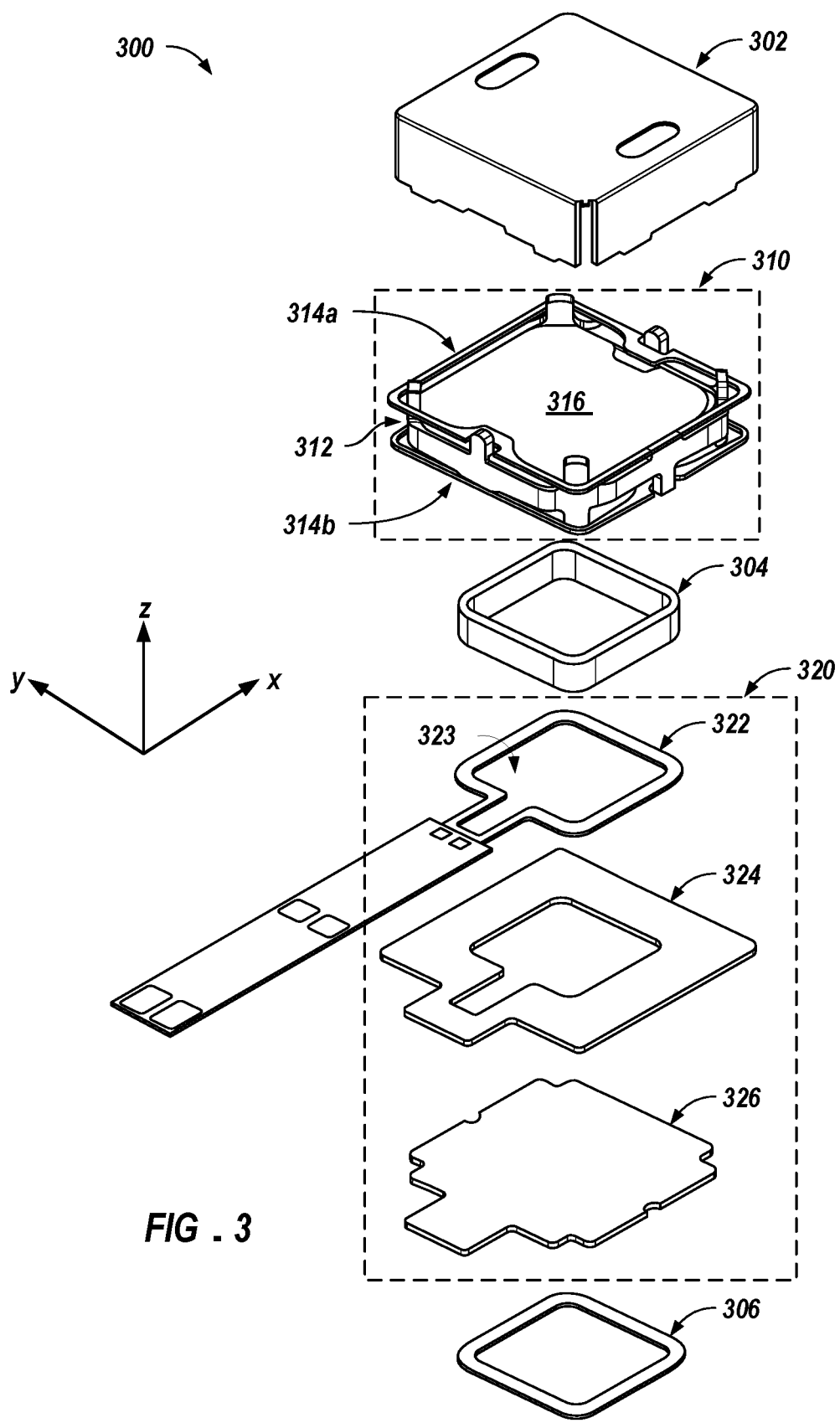
FIG. 3 is an exploded perspective view of an actuator module that includes a spacer.

Referring now to FIG. 3, an exploded perspective view of an actuator module 300 includes a spacer 306. Actuator module 300 further includes a hood 302, a moving magnet system 310, a coil 304, and an intermediate layer 320, which includes a printed circuit board (PCB) 322, a base-plate 324, and a pressure sensitive adhesive (PSA) 326. Actuator module 300 can be used to drive a panel, e.g., panel 104, of a panel audio loudspeaker such that the panel generates sound waves.

Actuator module 300 can be relatively compact. For example, hood 302, which has a substantially square profile in the xy-plane, can have an edge length (i.e., in the x- or y-directions) of about 25 mm or less (e.g., 20 mm or less, 15 mm or less, such as 14 mm, 12 mm, 10 mm or less). The actuator module's height (i.e., its dimension in the z-direction) can be about 10 mm or less (e.g., 8 mm or less, 6 mm or less, 5 mm or less). Hood 302 and frame 312 are connected to base-plate 324.

Figure 4A:
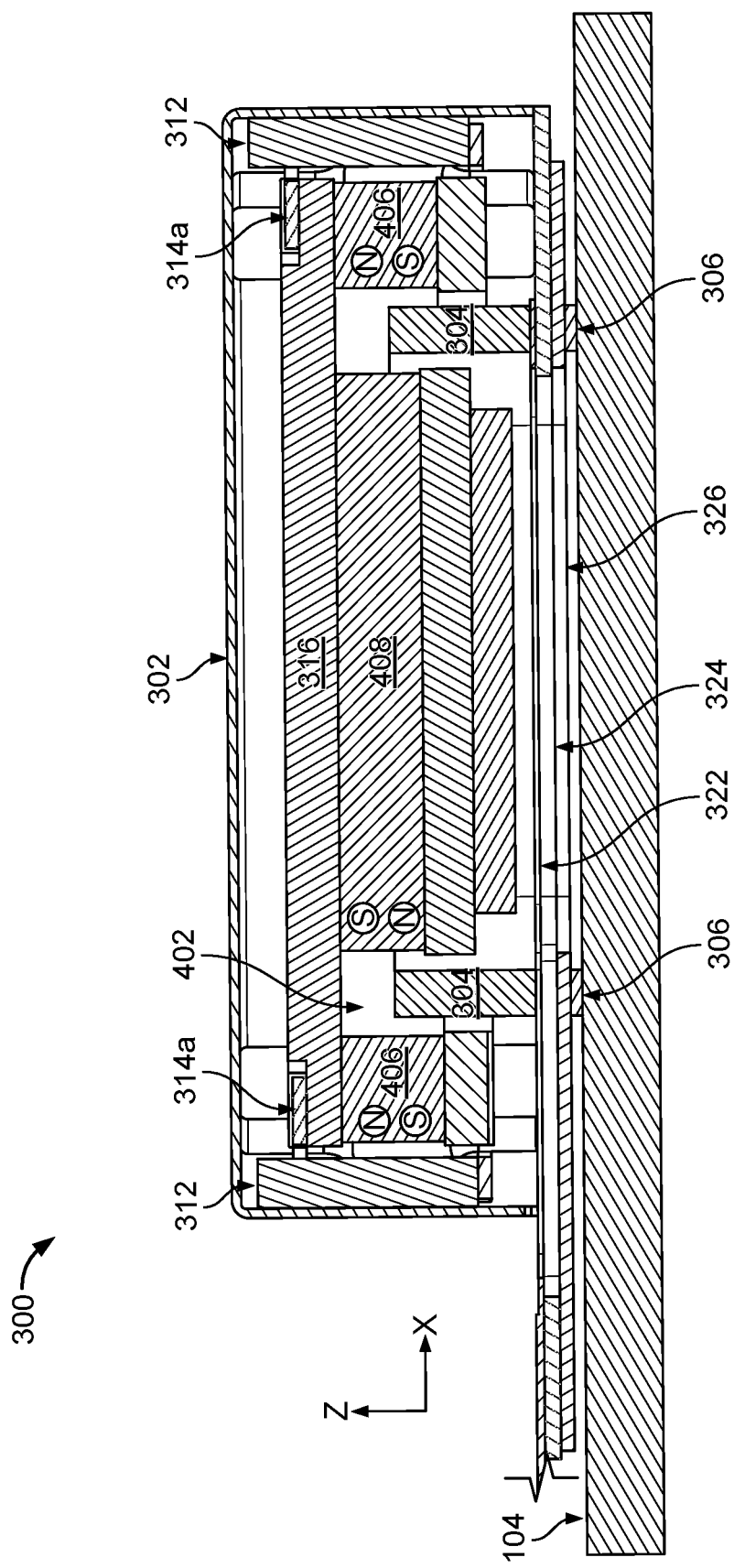
FIG. 4A is a cross-sectional view of the actuator module and spacer of FIG. 3, with the spacer of FIG. 3 connected to the panel of FIG. 1.

While FIG. 3 shows an exploded perspective view of the actuator module 300, FIG. 4A shows a cross-sectional view of actuator module 300 and spacer 306, with the spacer connected to panel 104. Referring now to FIGS. 3 and 4A, moving magnet system 310 includes a frame 312 to which two springs, 314a and 314b, are connected. Additionally, frame 312 is connected to base-plate 324. Moving magnet system 310 further includes a magnet assembly including magnets 406 and 408. The magnets 406 and 408 are suspended relative to the frame 312 by back plate 316 and by springs 314a and 314b. The springs 314a and 314 allow the magnets 406 and 408 to move in the z-direction. The magnets 406 and 408 are separated from each other by an air gap 402.

A first side of spacer 306 is attached to display panel 104. The spacer can have a thickness (i.e., in the z-direction) of about 1 mm or less (e.g., 0.8 mm or less, 0.75 mm or less, 0.5 mm or less). The spacer can be formed from a metal or plastic material. For example, the spacer 306 can be made from stainless steel, copper, lead, tin, aluminum, or a thermoplastic polymer.

A second side of spacer 306, opposite the first side, is connected along a portion of the intermediate layer 320. The intermediate layer 320 couples the second side of the spacer 306 to the coil 304. For example, PCB 322 is connected to base-plate 324, which is connected to PSA 326. Coil 304 is connected to PCB 322, while spacer 306 is connected to PSA 326. The PSA 326 can be, for example, a thin, flexible PSA tape, glue, or spray adhesive. The PSA 326 can have a thickness (i.e., in the z-direction) of about 0.15 mm or less (e.g., 0.1 mm or less, 0.08 mm or less, 0.05 mm or less).

The intermediate layer 320 can include an aperture 323 that aligns with the coil 304 in the z-direction. For example, the aperture 323 can have a similar shape as the voice coil 304 in the xy-plane. In some examples, a portion of the aperture may correspond to a portion of an inner and/or outer edge of the coil 304 in the xy-plane. In some examples, the aperture is c-shaped. In some examples, the aperture is o-shaped. In some examples, the aperture is square shaped. The intermediate layer can have a thickness (i.e., in the z-direction) of about 3 mm or less (e.g., 2 mm or less, 1.5 mm or less, 1.0 mm or less).

The coil 304 is not directly connected to moving magnet system 310. Rather, coil 304 extends at least partially into the air gap 402, between magnets 406 and 408. The coil 304 can be, for example, a voice coil. The voice coil defines an axis in the z-direction.

The frame 312 and the coil 304 are each connected to a first surface of the intermediate layer 320. Thus, the frame 312 and coil 304 are indirectly attached to one another via the intermediate layer 320. The spacer 306 is connected to a second surface of the intermediate layer 320 opposite the first surface. Therefore, the spacer 306 and the coil 304 are connected to opposite sides of the intermediate layer 320. The coil 304 may be aligned with the spacer 306 at the portion of the intermediate layer 320 to which the spacer 306 is connected.

Because frame 312 is not connected to panel 104, coil 304, spacer 306, and intermediate layer 320 form a combined mass, referred to as the combined coil mass. When actuator module 300 is used to drive panel 104 as a panel audio loudspeaker system, the combined coil mass moves in the z-direction, e.g., along with the movement of the display. Moving magnet system 310 forms a separate mass that can move relative to coil 304. Therefore, moving magnet system 310 is only indirectly connected to panel 104.

The weight of moving magnet system 310 is greater than the weight of coil 304. For example, the weight of moving magnet system 310 can be many times greater than the weight of the coil 304 (e.g., 2 times greater or more, 2.5 times greater or more, 3 times greater or more). Because of the relative weights of moving magnet system 310 and coil 304, the weight of the moving magnet system may impede the movement of panel 104 during the operation of the actuator module and otherwise reduce the acoustic output of the display. That is, the increasing the mass of the moving magnet system reduces the velocity of the display which reduces the acoustic output of the display. Therefore, the size, position, and stiffness of spacer 306 can be chosen such that the spacer can boost the output of panel 104 at at least certain frequencies.

In general, the stiffness of the spacer 306 at the region of connection to the intermediate layer 320 is less than the stiffness of the intermediate layer 320 at the portion of the intermediate layer 320 that connects to the spacer 306. In some examples, spacer 306 can have a lower stiffness than the combined stiffness of each sublayer of intermediate layer 320. In some embodiments the stiffness of spacer 306 is chosen to promote a resonance between the mass of coil 304 and the combined stiffness of the intermediate layer 320 and spacer 306. Among other advantages, the resonance between coil 304 and moving magnet system 310 can boost the output of a panel audio loudspeaker to which the actuator module 300 is attached.

In some implementations, the stiffnesses may refer to a stiffness in the z-direction.

For example, in some implementations, the angular resonance frequency, $\omega$, of the coil 304 and/or the moving magnet system 310 can be calculated using the equation $\omega = \sqrt{k/m}$, where k is the combined stiffness of the intermediate layer, the spacer, and the panel; and m is the mass of the coil. For a frequency of 8 kHz and mass of 0.2 g, an example stiffness can be $k=m\omega^2=(0.2e-3)(2\pi f)^2=5.1e5$ N/m. The combined stiffness of the spacer, intermediate layer, and panel can be in the range of approximately 1.2e5 N/m to approximately 2.1e6 N/m. The stiffness of the intermediate layer 320 at the portion of the intermediate layer 320 that connects to the spacer 306 can be, for example, in the range of approximately 5.0e5 N/m to 1.0e6 N/m. The stiffness of the spacer 306 at the region of connection to the intermediate layer 320 may be, for example, in the range of approximately 1.2e5 N/m to 5.0e5 N/m.

Spacer 306 is shaped such that its footprint, i.e., its profile when viewed in the xy-plane, is substantially the same as the footprint of coil 304. The outer edge of coil 304 and spacer 306 is substantially square-shaped with rounded corners and enclosing an interior aperture. The spacer 306 can be classified as "o-shaped," with an aperture in the center of the spacer 306, and spacer material surrounding the aperture. While FIG. 3 shows an embodiment in which spacer 306 is o-shaped, other shapes are possible. In some embodiments, instead of being o-shaped, a spacer can be substantially square-shaped with rounded corners and without an interior aperture, that is, such that the interior aperture of spacer 306 is filled in. In such an embodiment, the length and width of the spacer, as measured in the x and y-directions, can be approximately the same as the length and width of coil 304 as measured in the x and y-directions.

Figure 4B:
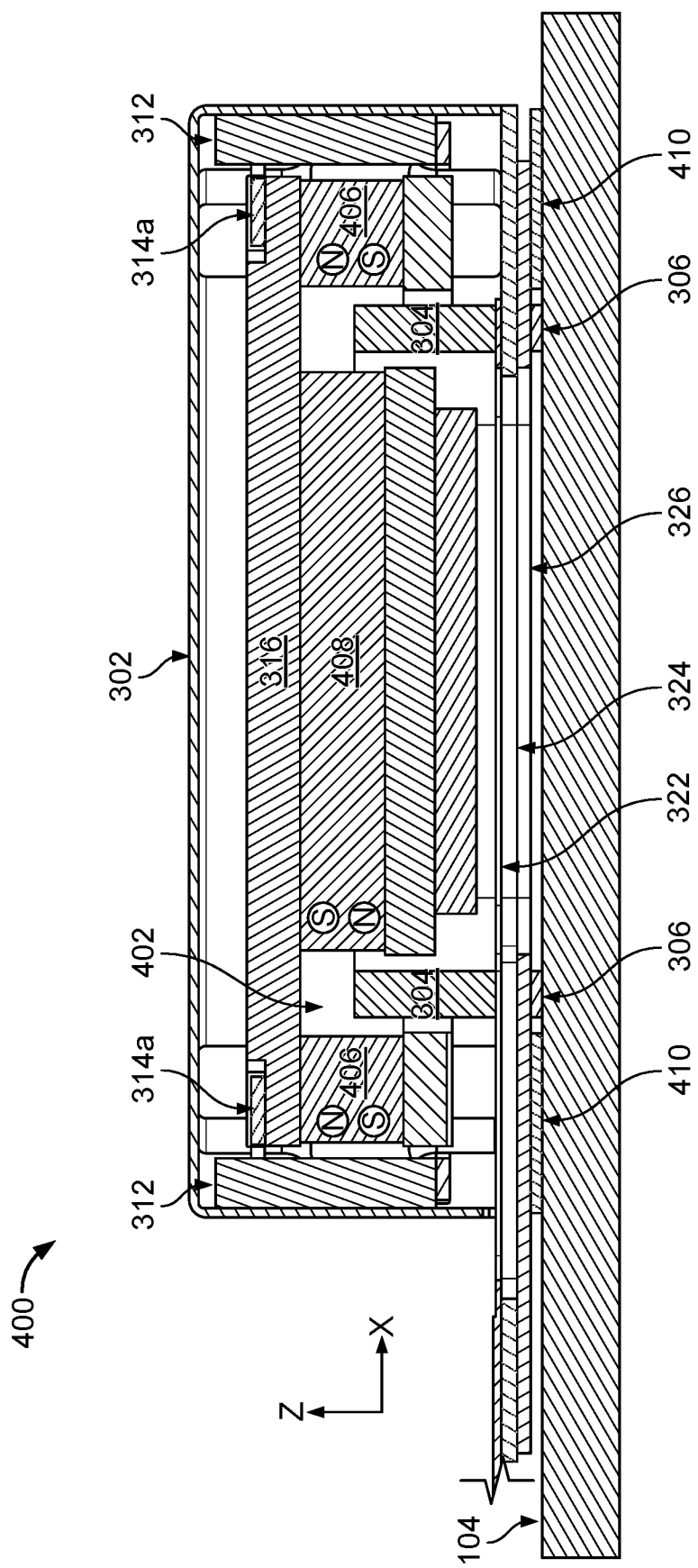
FIG. 4B is a cross-sectional view of an actuator module, which includes a ring of compliant material.

In addition to including a spacer, such as spacer 306, an actuator module can include a ring of compliant material that surrounds the spacer. Referring to FIG. 4B, an actuator module 400 includes the components described with respect to actuator module 300, with the addition of a ring of compliant material 410, referred to as compliant ring 410.

Compliant ring 410 is positioned between panel 104 and moving magnet system 310. In some examples, one surface of the compliant ring 410 is attached to the panel 104, and another surface of the compliant ring 410 is attached to the intermediate layer 320.

In some examples, the compliant ring 410 is coplanar with the spacer 306. In some examples, the compliant ring 410 surrounds the spacer 306. In some examples, the compliant ring is aligned with the frame 312 in the z-direction. In some examples, the compliant ring is aligned with the frame 312 and with at least one of the magnets of the magnet assembly in the z-direction.

In the example of FIG. 4B, compliant ring 410 is positioned between panel 104 on one side, and frame 312 and magnet 406 on the opposite side. The inclusion of compliant ring 410 promotes stability of the structure under drop conditions and during normal operation, at the cost of increasing the coupling between the panel and the mass of the frame and cap.

Compliant ring 410 has a stiffness significantly lower than that of spacer 306 (e.g., 12 times lower, 10 times less, 8 times lower). Compliant ring 410 is made of a material having a viscoelastic property promoting the absorption of energy, that is, it should be a material that promotes damping. The compliant material can be, for example, a foam or elastomer material, such as a urethane foam material.

In other embodiments, a compliant ring can be positioned between panel 104 and one or more of the heaviest components of a moving magnet system. For example, a compliant ring can be positioned between panel 104 and a frame of an actuator module, or between the display and one or more supporting plates of an actuator module.

While FIGS. 3 and 4A show an embodiment in which coil 304 is indirectly attached to panel 104 by intermediate layer 320, in some embodiments the coil can be directly attached to the display. While intermediate layer 320 is positioned between coil 304 and panel 104; therefore, preventing the coil from attaching directly to the display, a portion of the intermediate layer can be removed.

Figure 5A:
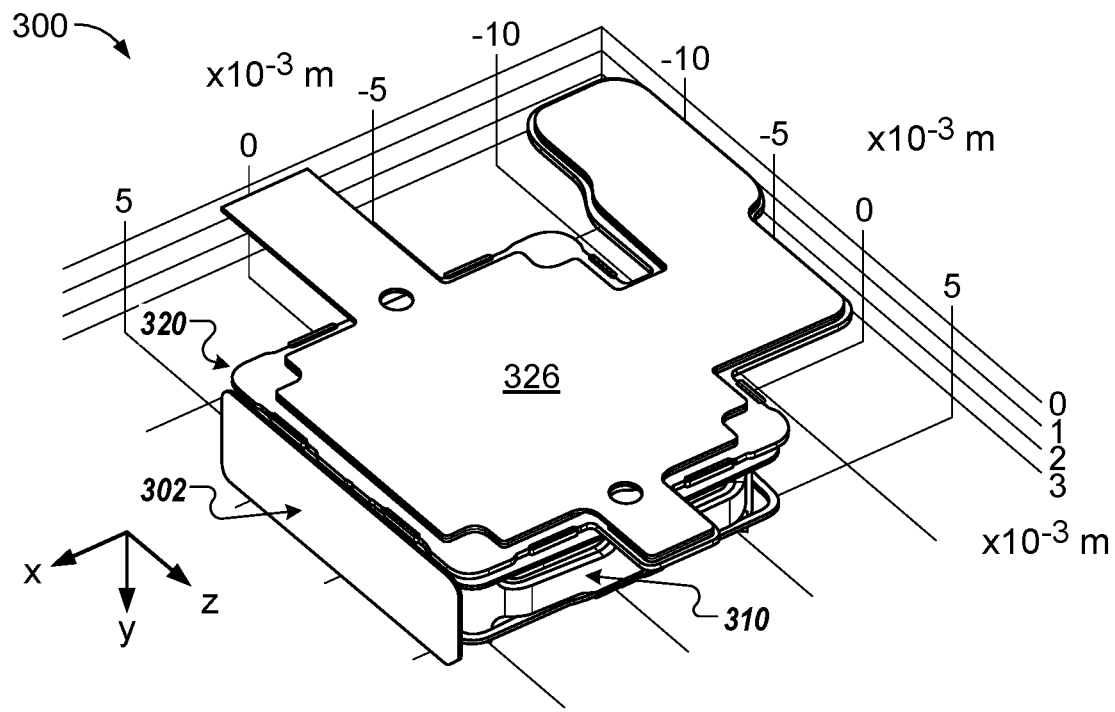
FIG. 5A is a perspective bottom view of the actuator module of FIG. 3 with the spacer of FIG. 3 removed to show a pressure sensitive adhesive of the actuator module.

FIG. 5A illustrates a perspective bottom view of actuator module 300 with spacer 306 removed to show PSA 326. Actuator module 300 includes hood 302, moving magnet system 310, and coil 304 (not shown). Actuator module 300 also includes intermediate layer 320, which includes the PSA 326. The intermediate layer 320 does not have any portions removed.

Figure 5B:
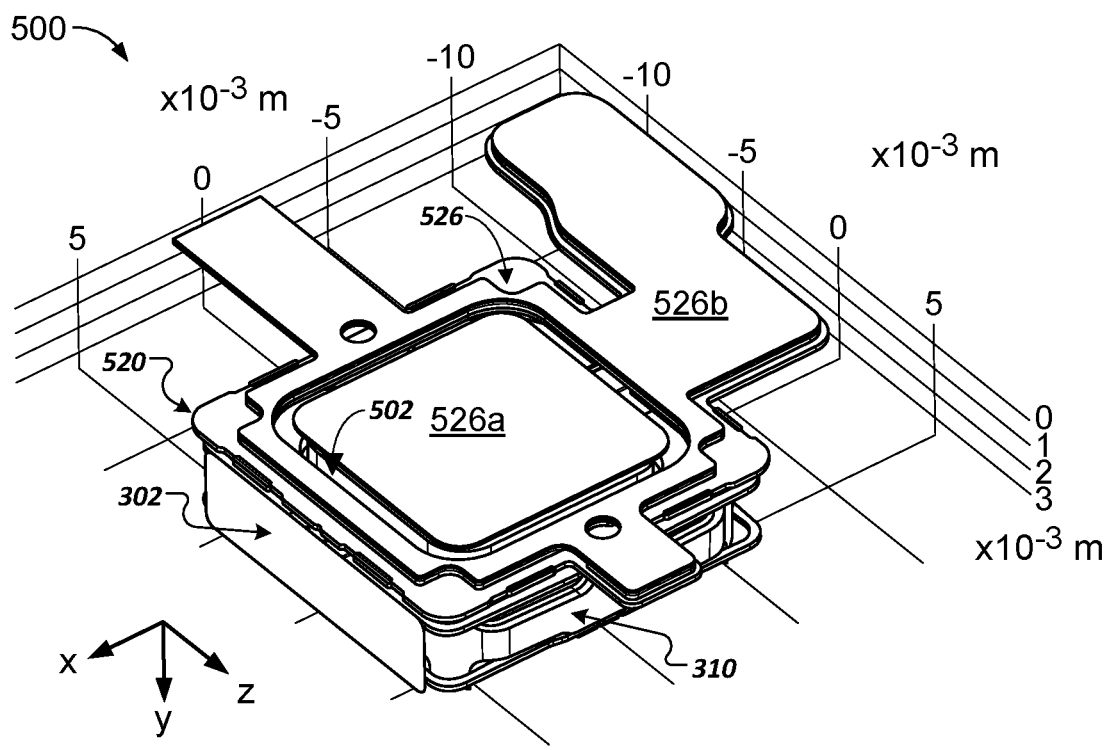
FIG. 5B is perspective bottom view of an actuator module having an o-shaped cut removed from an intermediate layer of an actuator module.

FIG. 5B illustrates a perspective bottom view of an actuator module 500, which has an o-shaped cut, or aperture 502, removed from an intermediate layer 520. The o-shaped aperture 502 completely separates an inner portion 526a of PSA 526 from an outer portion 526b of the PSA 526. Like actuator module 300, actuator module 500 includes hood 302, moving magnet system 310, and coil 304 (not shown).

In the example of FIG. 5B, the o-shaped aperture 502 extends through all of intermediate layer 520, however, in some embodiments, only some of the sublayers of the intermediate layer 520 are cut, e.g., the one or more layers having the greatest stiffness. In some embodiments, an intermediate layer can include a PSA, one or more polyimide layers, e.g., for insulation, and a layer of stiff material, e.g., aluminum. For example, the base-plate 324 may be a stiff layer that is formed from a metal such as aluminum, tin or copper. In such an embodiment, the layer of stiff material and the one or more polyimide layers can be cut while the PSA is not cut. The PSA need not be cut as it is compliant and will provide a relative compliant connection between the coil and the other massive components of the actuator module. In these embodiments, the thickness of the intermediate layer at the aperture can be, for example, about 0.15 mm or less (e.g., 0.1 mm or less, 0.08 mm or less, 0.05 mm or less). The thickness of the intermediate layer at regions other than the aperture can be, for example, about 3 mm or less (e.g., 2 mm or less, 1.5 mm or less, 1.0 mm or less).

Like intermediate layer 320, intermediate layer 520 includes a PCB, base-plate, and a PSA. Although the PCB and the base-plate of intermediate layer 520 are obscured in FIG. 5B, a PSA 526 is visible. Panel 104 is omitted from FIGS. 5A and 5B. An o-shaped portion is removed from the PCB, the base-plate, and PSA 526 of intermediate layer 520 such that force generated by coil 304 can pass through intermediate layer 520 and into panel 104. The o-shaped aperture 502 of intermediate layer 520 separates an inner portion 526a of the PSA 526 from an outer portion 526b. In some examples, the coil 304 is connected to the inner portion 526a.

In the example of FIG. 5B, coil 304 has reduced coupling to the massive components of the actuator module, e.g., frame 312 and magnets 406 and 408, compared to FIG. 5A. Because of the reduced coupling via the intermediate layer 520, the coil 304 of actuator module 500 can move more freely, compared to an embodiment in which intermediate layer 320 couples the coil to massive components of the actuator. The increased freedom of coil 304 results in increased velocity for the same excitation force and some of this increased velocity can propagate into the rest of panel 104 in spite of the coupling of the massive components to the display. This can allow the display to exhibit an increased response at at least some frequencies, as compared to the frequency response exhibited by panel 104 when intermediate layer 320 acts to couple coil 304 to the massive components of the actuator module.

In some implementations, instead of forming an aperture in the intermediate layer, the PSA of the intermediate layer can be removed so there is a physical gap between the outer part of the actuator module and panel 104. The intermediate layer, e.g., including base-plate 324, can then act as a supporting member for the actuator module.

In embodiments in which the intermediate layer 320 is connected to the panel 104, the panel 104 supports most or all of the mass of the actuator module. In contrast, in the example of FIG. 5B, panel 104 can move more freely because of the reduction of mass coupled to the panel. That is, the mass coupled to the panel is reduced because the components of actuator module 500, other than the coil 304, are not connected to panel 104. The reduction of mass coupled to panel 104 can allow the display to exhibit an increased response at at least some frequencies, as compared to the frequency response exhibited by panel 104 when intermediate layer 320 is connected to the display.

Figure 6A:
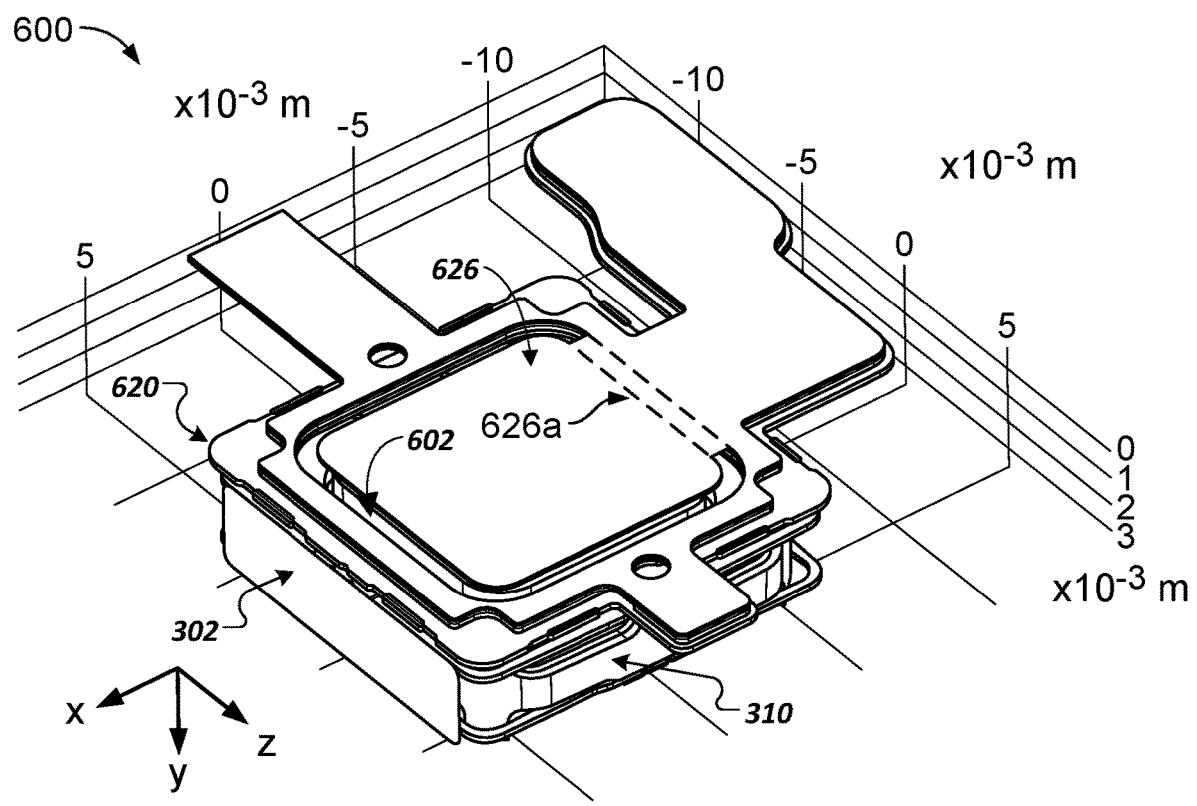
FIG. 6A is a perspective view of an actuator module that includes an intermediate layer having a c-shaped aperture.

While FIG. 5B shows an actuator module 500 that includes intermediate layer 520 with an o-shaped aperture cut from the intermediate layer, in some embodiments, a differently shaped aperture can be cut from an intermediate layer of an actuator module. For example, Referring to FIG. 6A, a perspective view of an actuator module 600 includes an intermediate layer 620 having a c-shaped aperture 602. Like actuator module 300, actuator module 600 includes hood 302, moving magnet system 310, and coil 304 (not shown). Like intermediate layers 320 and 520, intermediate layer 620 includes a PCB, a base-plate, and a PSA. Although the PCB and the base-plate of intermediate layer 620 are obscured in FIG. 6, a PSA 626 is visible. Panel 104 is omitted from FIG. 6.

Comparing PSA 326 and PSA 626, the latter has a c-shaped aperture 602 rather than an o-shaped aperture. Coil 304 is attached to intermediate layer 620. That is, the coil 304 can be attached to a portion of PSA 626 that is labeled 626a and is outlined in dashed lines. The c-shaped aperture 602 allows intermediate layer 620 to weakly couple coil 304 to the remaining components of actuator module 600. The c-shaped aperture 602 provides more coupling between the coil 304 and other components of the actuator module 600, compared to the o-shaped aperture 502. The c-shaped aperture 602 also allows for better manufacturability of the intermediate layer 620, when compared with the intermediate layer 520 having an o-shaped aperture 502.

In some embodiments, hood 302 and moving magnet system 310 are each supported by a supporting member that is not connected to the intermediate layer 620. For example, in some embodiments, the coil 304 is connected to intermediate layer 620 at portion 626a, and the intermediate layer is connected to panel 104. Hood 302 and moving magnet system 310 are connected to neither intermediate layer 620 nor to the panel 104.

Figure 6B:
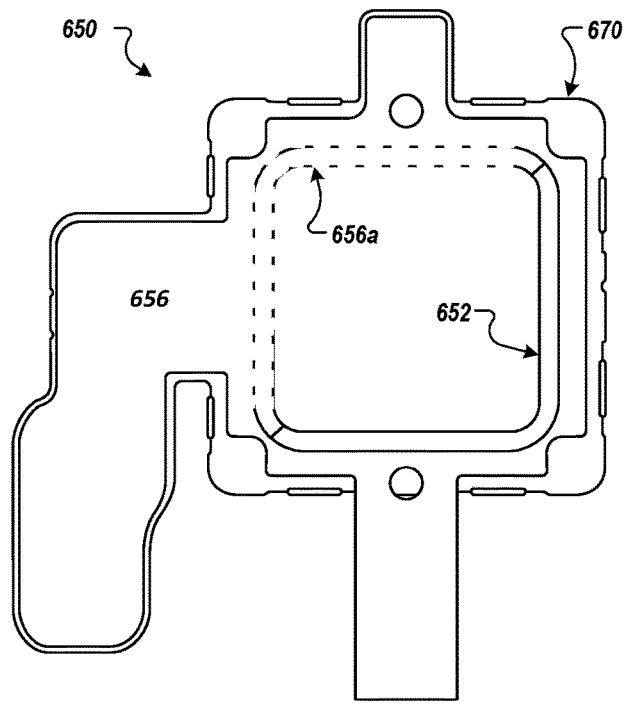
FIG. 6B shows a bottom view of an example actuator module that includes an L-shaped aperture.
Figure 6C:
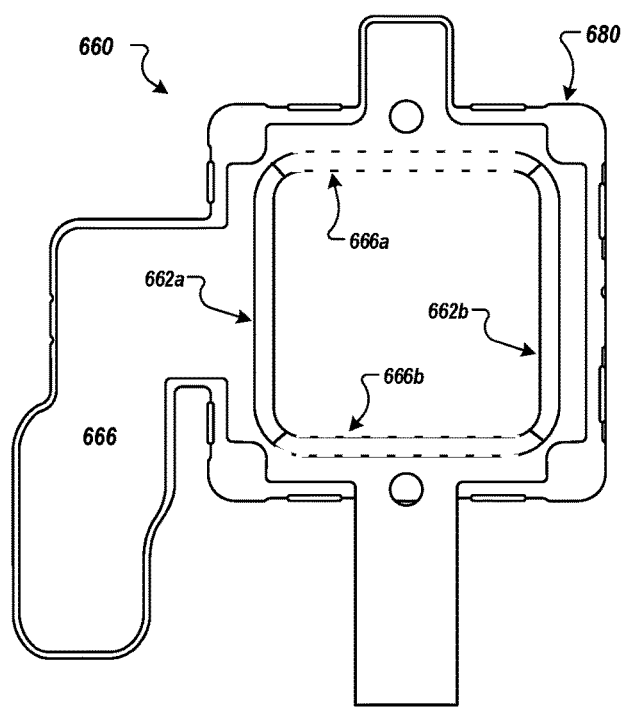
FIG. 6C shows a bottom view of an example actuator module that includes two parallel apertures.

In some embodiments, an intermediate layer can include an aperture of a shape other than an "o" or "c" shape. FIGS. 6B and 6C show bottom views of example actuator modules with apertures of other shapes. FIG. 6B shows a bottom view of an example actuator module 650 with an "L-shaped" aperture 652 in the intermediate layer 670. In the actuator module 650, coil 304 (not shown) is attached to intermediate layer 670. For example, the coil 304 can be attached to a portion of PSA 656 that is labeled 656a and is outlined in dashed lines. The L-shaped aperture 652 provides more coupling between the coil 304 and other components of the actuator module 600, compared to the o-shaped aperture 502 and the c-shaped aperture 602.

FIG. 6C shows a bottom view of an example actuator module 660 with two parallel apertures 662a and 662b in the intermediate layer 680. In the actuator module 660, coil 304 (not shown) is attached to intermediate layer 680. For example, the coil 304 can be attached to portions of PSA 666 that are labeled 666a and 666b and are outlined in dashed lines. The parallel apertures 662a and 662b provide more coupling between the coil 304 and other components of the actuator module 600, compared to the o-shaped aperture 502 and the c-shaped aperture 602.

FIGS. 7A to 7F and 8A to 8D include plots that simulate the frequency response of panels driven by various example actuator modules. The panels are 10 cm² aluminum plates to which the example actuator module is attached at the center of the plate. The thickness of the plate is 1 mm. The horizontal axes shows frequency, measured in Hz. The label F=±0.5 N refers to a force applied to the moving magnet system and a force applied to the coil.

In the discussion of FIGS. 7 Ato 7F and 8A to 8D the reference actuator is actuator module 300 without spacer 306. The reference actuator is attached to the panels by intermediate layer 320. That is, PSA 326 attaches the components of the reference actuator to the surface of the panels.

Figure 7A:
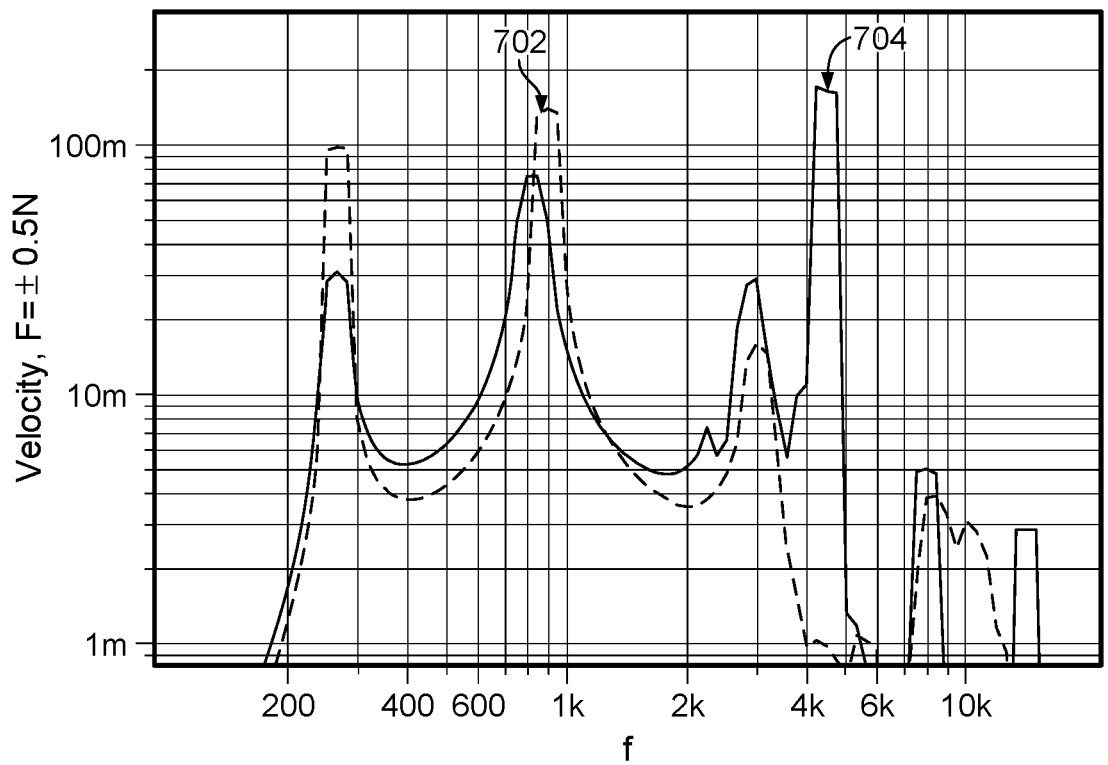
FIG. 7A is a plot showing a curve corresponding to the average velocity of an undamped panel driven by a reference actuator module and a curve corresponding to the average velocity of the undamped panel driven by a modified actuator module.

FIG. 7A is a plot 700A that shows a curve 702 corresponding to the average velocity of an undamped panel driven by the reference actuator module and a curve 704 corresponding to the average velocity of the undamped panel driven by a modified actuator module. The vertical axis shows the average velocity of the undamped panel, measured in m/s. The modified actuator module corresponding to plot 700A is actuator module 500, having o-shaped aperture 502.

Figure 7B:
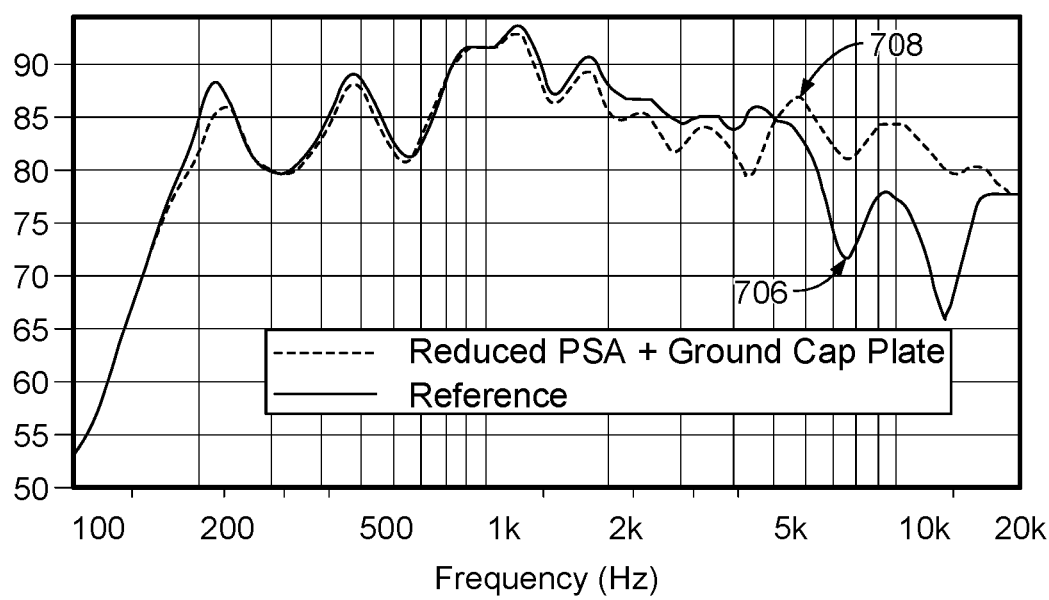
FIG. 7B is a plot showing a curve corresponding to the sound pressure level output by a damped panel to which the reference actuator module described with regard to FIG. 7A is connected and a curve corresponding to the sound pressure level output by the same panel to which the modified actuator module described with regard to FIG. 7A is connected.

FIG. 7B is a plot 700B showing a curve 706 corresponding to the sound pressure level output by a damped panel to which the reference actuator module is connected. Plot 700B also shows a curve 708 corresponding to the sound pressure level output by the same damped panel to which the modified actuator module is connected. The modified actuator module is the actuator module 500 as described with respect to FIG. 5B. The plot 700B shows an increased SPL output by the damped panel driven by the modified actuator module as compared to the SPL output by the damped panel driven by the reference actuator module. The increase in SPL corresponds to frequencies between 5 kHz to 20 kHz.

Figure 7C:
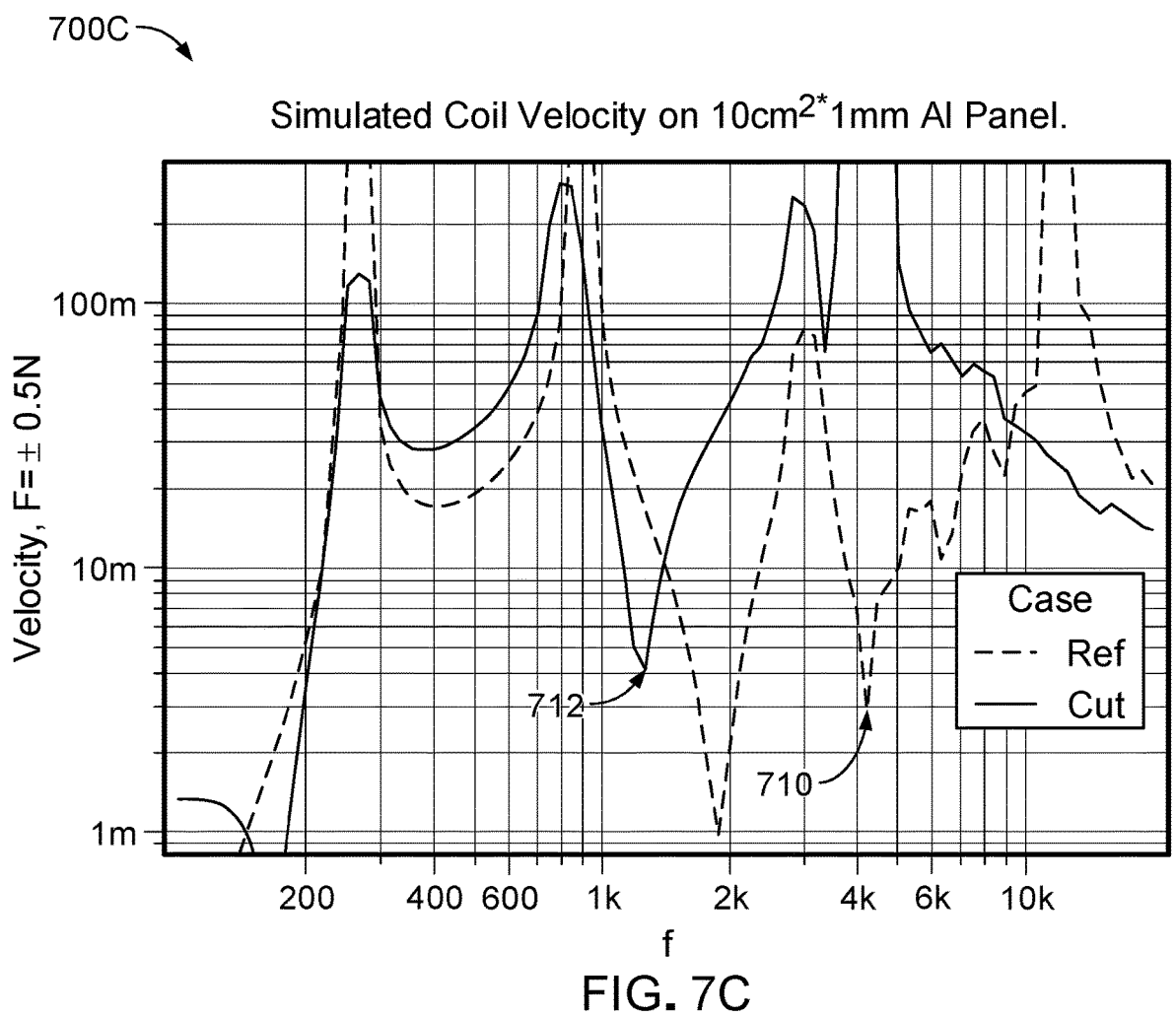
FIG. 7C is a plot showing a curve corresponding to the velocity of the coil of the reference actuator module and a curve corresponding to the velocity of the coil of the modified actuator described with regard to FIG. 7A.

While the curves of FIG. 7A correspond to the average velocity of the undamped panel, FIG. 7C shows curves corresponding to the velocity of the coil. FIG. 7C is a plot 700C showing a curve 710 corresponding to the velocity of the coil of the reference actuator module 300. FIG. 7C also shows a curve 712 corresponding to the velocity of the coil of the modified actuator module 500. Plot 700C shows that including an aperture in intermediate layer 520 and choosing the through stiffness appropriately, a through-thickness resonance can be established with an associated increase in coil velocity. At least some of this increase in coil velocity causes an increase in the panel velocity.

Figure 7D:
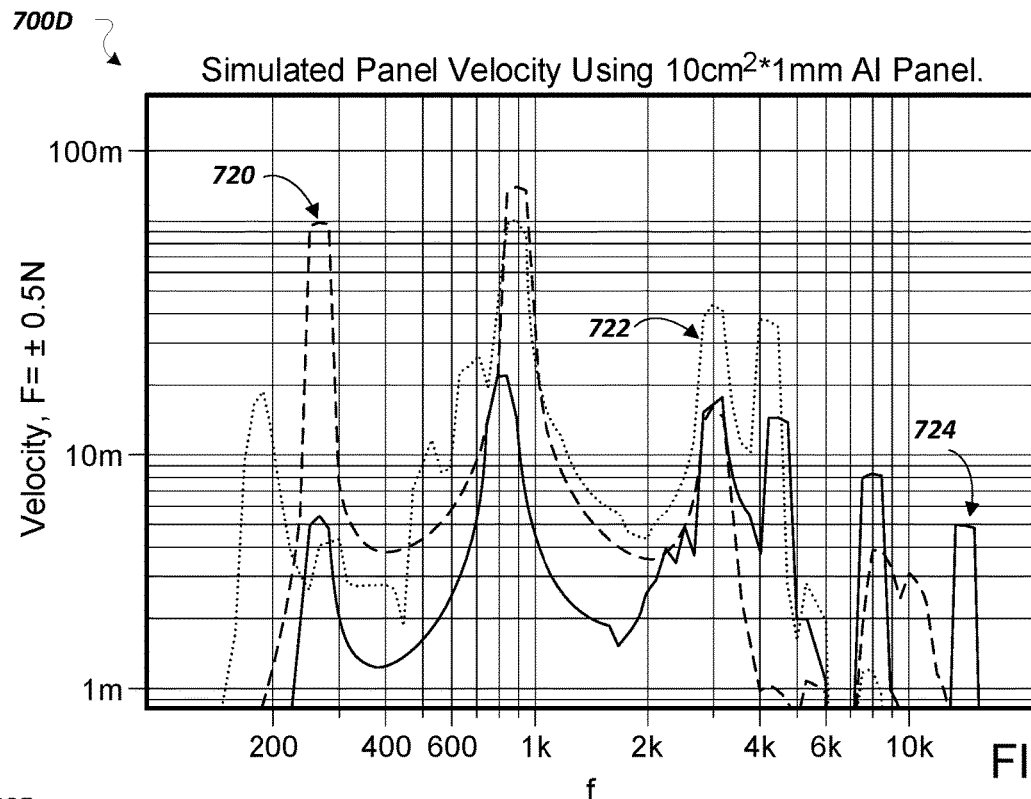
FIG. 7D is a plot showing a curve corresponding to the average velocity of an undamped panel driven by a reference actuator module, a module with an 'o' shaped cut and a module with a spacer..
Figure 7E:
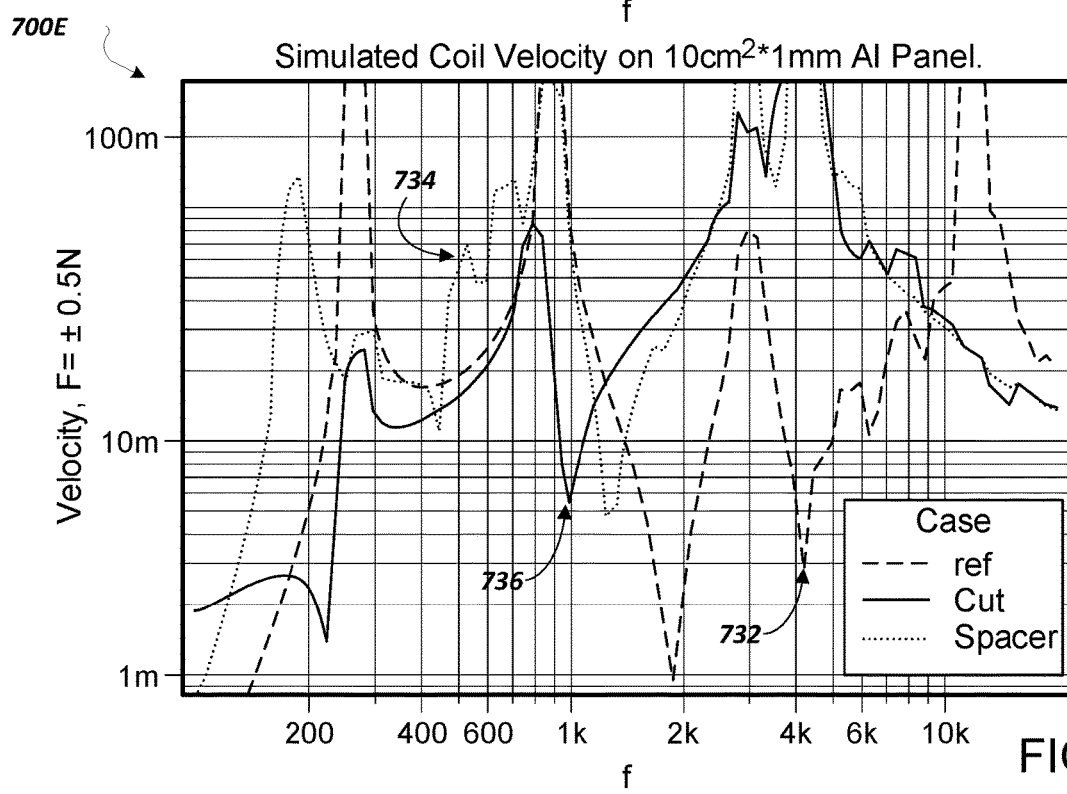
FIG. 7E is a plot showing a curve corresponding to the velocity of a coil of the reference actuator module, the 'o' shaped cut actuator and the actuator featuring a spacer.

FIGS. 7D and 7E show curves corresponding to the velocity of the panel and of the coil, respectively. FIG. 7D is a plot 700D showing a curve 720 corresponding to the velocity of an undamped panel driven by the reference actuator module 300. The plot 700D also shows a curve 722 corresponding to the velocity of the panel coupled to a first modified actuator module having a spacer, e.g., the spacer 306. The plot 700D also shows a curve 724 corresponding to the velocity of the panel coupled to a second modified actuator module having a c-shaped cut or aperture, e.g., the aperture 602 of the actuator module 600.

The plot 700D shows an increased panel velocity at some frequencies for the first modified actuator module and the second modified actuator module as compared to the panel velocity of the reference actuator module. The increase in panel velocity is most significant between frequencies 1 kHz and 6 kHz for the first modified actuator module having the spacer 306. The increase in panel velocity is most significant between frequencies above 3 kHz, e.g., between 3 kHz and 20 kHz, for the second modified actuator having the c-shaped aperture 602.

FIG. 7E is a plot 700E showing a curve 732 corresponding to the velocity of a coil of the reference actuator module 300, e.g., the coil 304. The plot 700E also shows a curve 734 corresponding to the velocity of the coil of the first modified actuator module having the spacer 306. The plot 700E also shows a curve 736 corresponding to the velocity of the coil coupled to the second modified actuator module having the c-shaped aperture 602.

The plot 700E shows an increased coil velocity for both the first modified actuator module and the second actuator module as compared to the coil velocity of the reference actuator module. The increase in velocity is most significant around frequencies of 2 kHz and 4 kHz. Additionally, the plot 700E shows an increased coil velocity for the first modified actuator module, having the spacer 306, compared to the second modified actuator, having the c-shaped aperture 602.

Figure 7F:
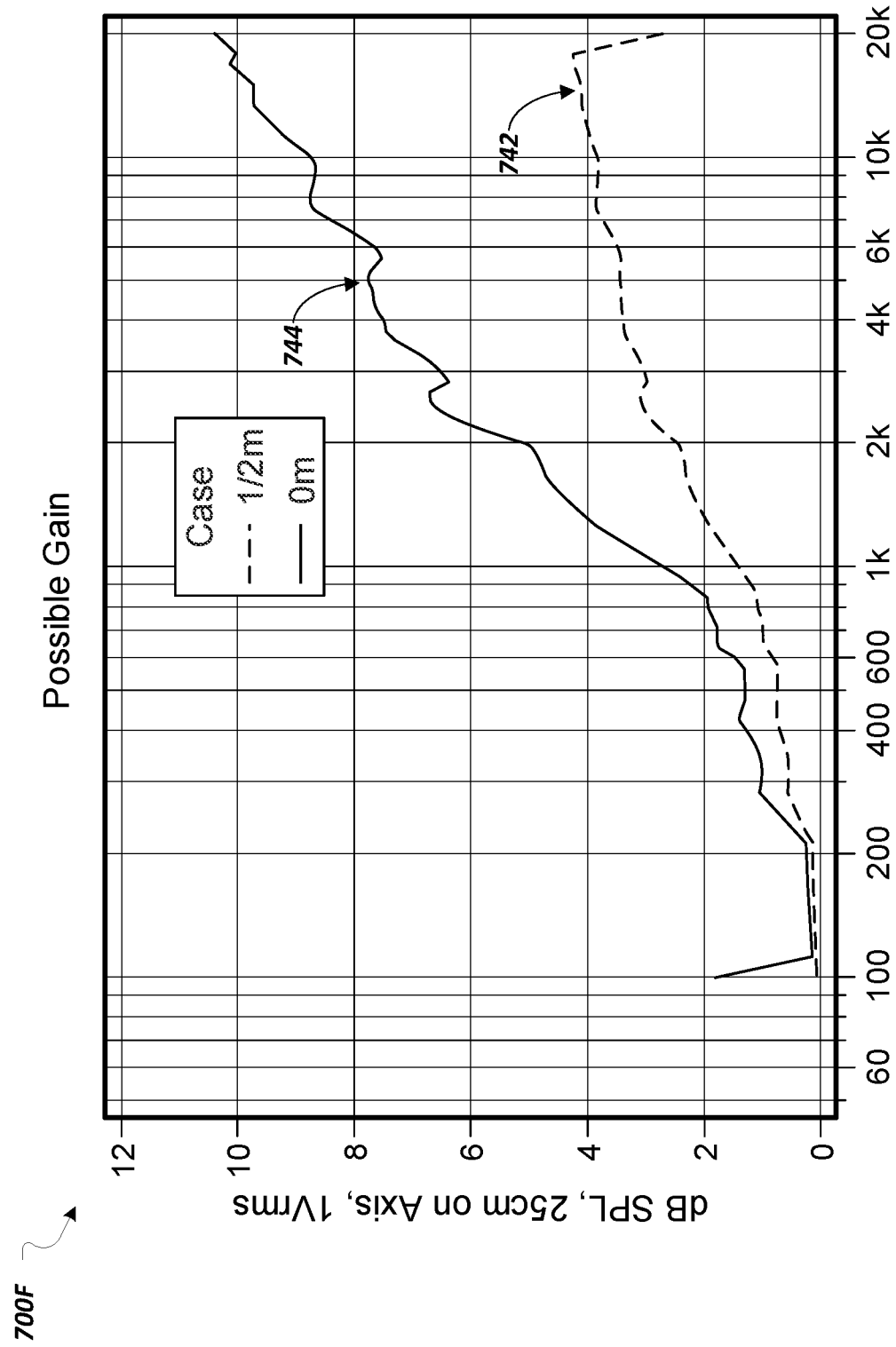
FIG. 7F is a plot 700F showing two curves that illustrate the possible gain achieved by reducing the mass of the actuator that is coupled to the panel.

FIG. 7F is a plot 700F showing two curves that illustrate the possible gain achieved by reducing the mass of the actuator that is coupled to the panel. The curve 742 shows the gain that can be achieved by reducing the mass of the actuator that is coupled to the panel by one half. The curve 744 shows the gain that can be achieved by reducing the mass of the actuator that is coupled to the panel to zero mass. The plot 700F shows a gain of between approximately 2 dB and 4 dB for frequencies between 1 kHz and 10 kHz for a mass reduction of one half. The plot 700F also shows a gain of between approximately 3 dB and 9 dB for frequencies between 1 kHz and 10 kHz for a mass reduction to zero mass.

Figure 8A:
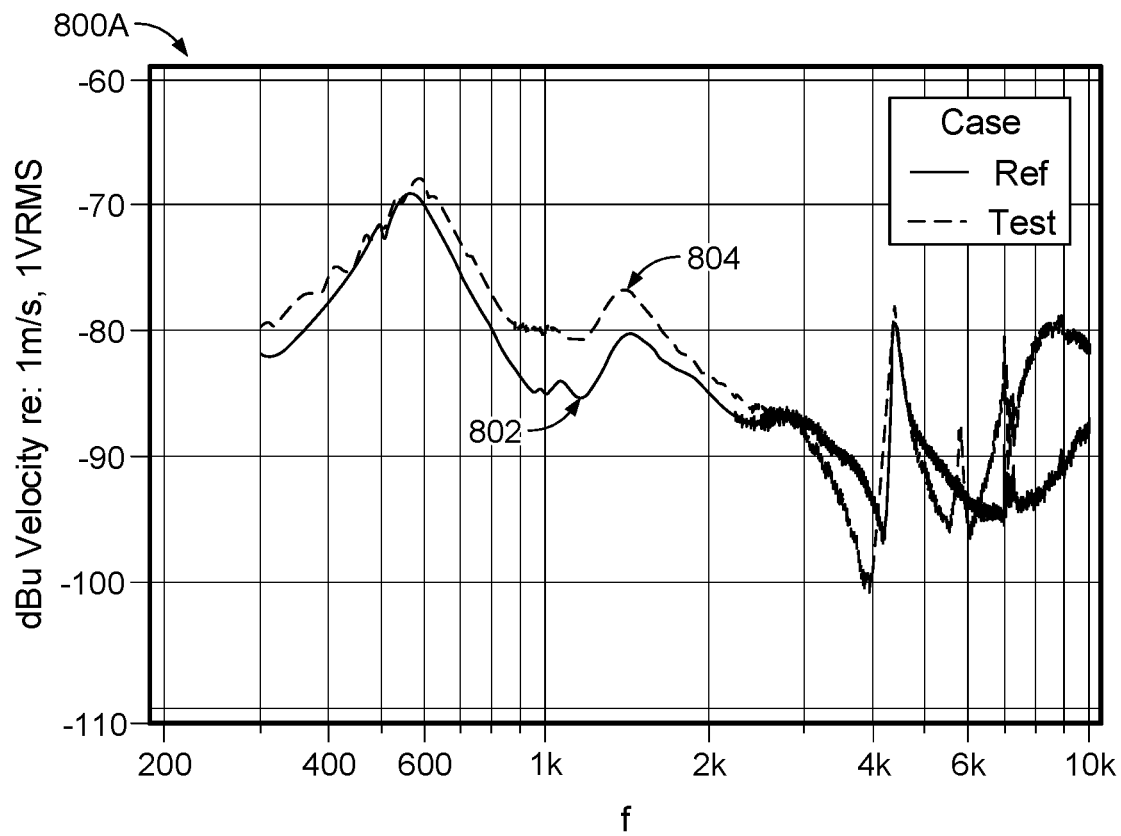
FIG. 8A is a plot showing the effect on the velocity of a damped panel when a spacer attaches the reference actuator module to the damped panel.
Figure 8B:
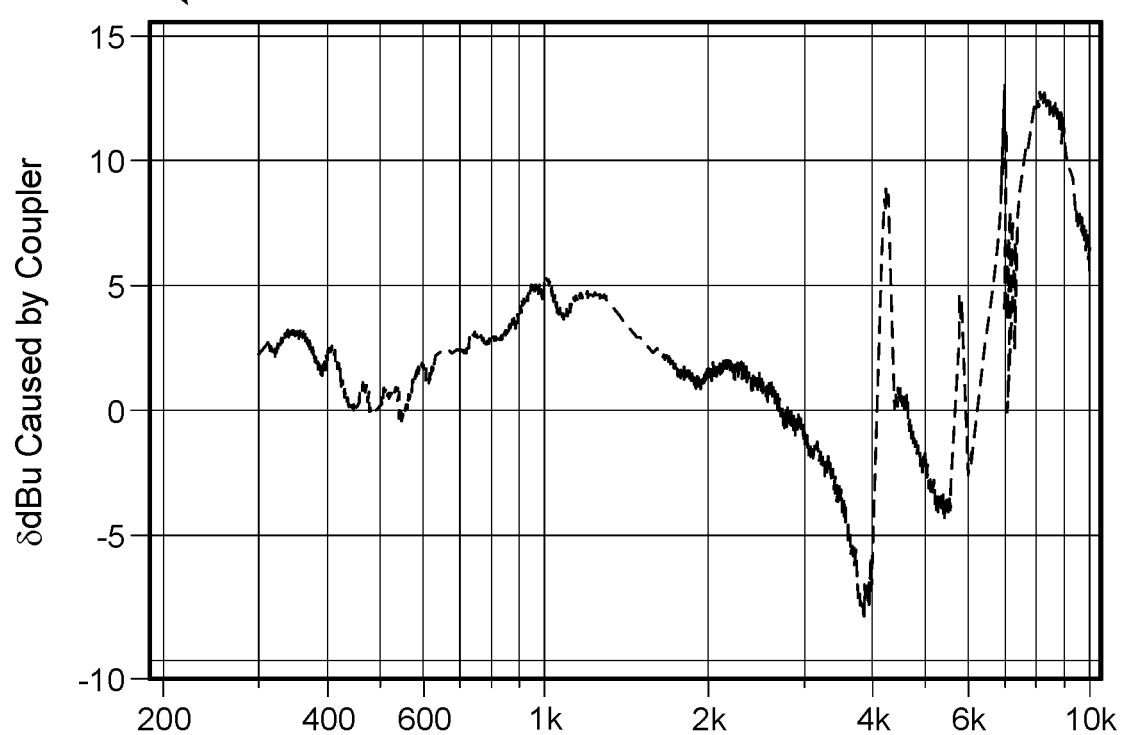
FIG. 8B is a plot that shows the difference between two curves described with respect to FIG. 8A.

FIG. 8A is a plot 800A showing the effect on the velocity of a damped 10 cm*10 cm panel when a spacer, such as spacer 306, attaches the reference actuator module to the damped panel. The vertical axis is the ratio of velocity compared to a reference velocity of 1 m/s, and is measured in dB m/s. Curve 802 corresponding to the ratio of the velocity for the reference actuator module connected to the damped panel, while curve 804 corresponds to the ratio of the velocity for the reference actuator module attached to the damped panel by spacer 306. The reference actuator module was excited with 1 volt RMS signal. Plot 800A shows an improvement, i.e., an increase, in panel velocity for frequencies between 300 Hz and 2.5 kHz and for frequencies between 6 kHz and 10 kHz. FIG. 8B is a plot 800B that shows the difference between curve 804 and curve 802.

Figures 8C, 8D:
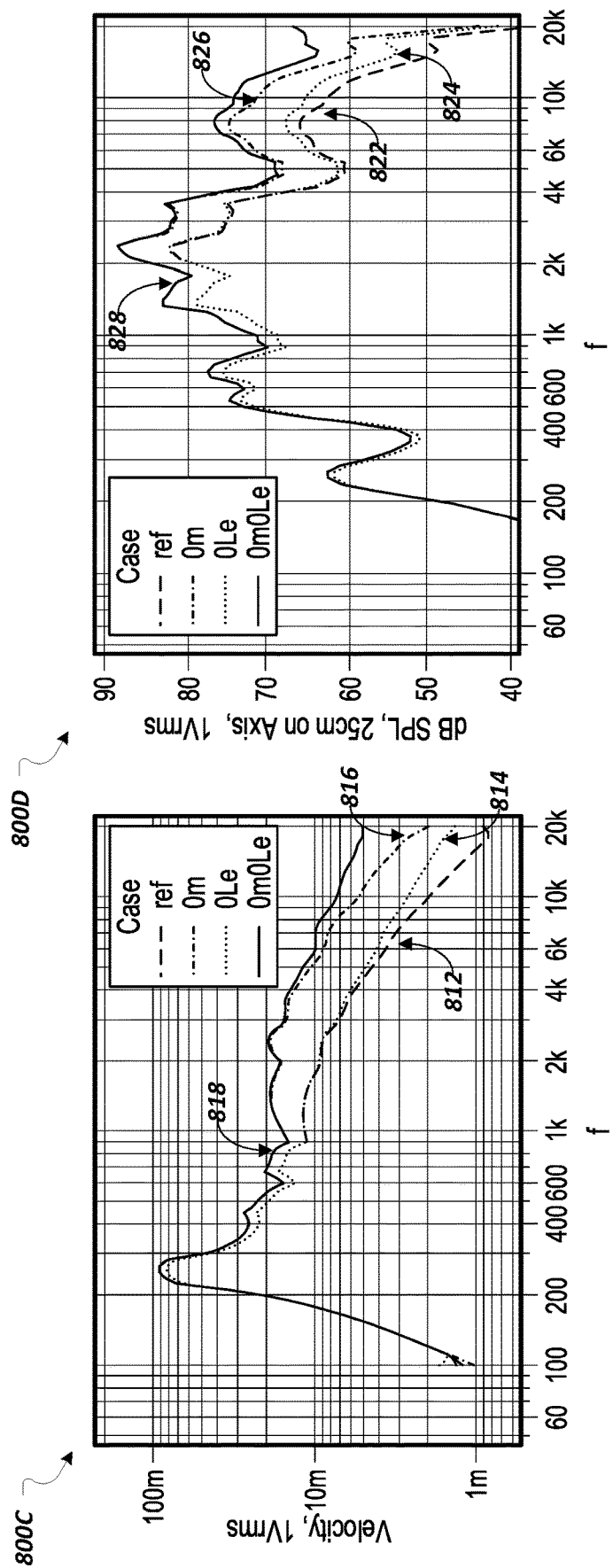
FIG. 8C is a plot showing a simulated panel velocity for various masses and inductances of the actuator module.
FIG. 8D is a plot showing a simulated sound pressure level output by a panel driven by an actuator for various masses and inductances of the actuator module.

FIG. 8C is a plot 800C showing a simulated panel velocity for various masses and inductances of the actuator module. The simulation represents the mass and inductance of components of the actuator using electrical circuit components. Plot 800C shows a curve 812 corresponding to the velocity of an undamped panel driven by the reference actuator module 300. The plot 800C also shows a curve 814 corresponding to the velocity of the panel driven by the reference actuator with zero inductance. The plot 800C also shows a curve 816 corresponding to the velocity of the panel driven by the reference actuator with zero mass. The plot 800C also shows a curve 818 corresponding to the velocity of the panel driven by the reference actuator with zero mass and inductance.

The plot 800C shows increased panel velocity for reduced mass and reduced inductance. In general, the reduced mass has a greater impact on panel velocity than reduced inductance. The increased panel velocity due to reduced mass is most significant at frequencies greater than 1 kHz, e.g., between 1 kHz and 20 kHz. The increased panel velocity due to reduced inductance is most significant at frequencies greater than 5 kHz, e.g., between 5 kHz and 20 kHz.

FIG. 8D is a plot 800D showing a simulated sound pressure level output by a panel driven by an actuator for various masses and inductances. The simulation represents the mass and inductance of components of the actuator using electrical circuit components. Plot 800D shows a curve 822 corresponding to the sound pressure level of an undamped panel driven by the reference actuator module 300. The plot 800D also shows a curve 824 corresponding to the sound pressure level output by the panel driven by the reference actuator with zero inductance. The plot 800D also shows a curve 826 corresponding to the sound pressure level output by the panel driven by the reference actuator with zero mass. The plot 800D also shows a curve 828 corresponding to the sound pressure level output by the panel driven by the reference actuator with zero mass and inductance.

The plot 800D shows increased sound pressure level for reduced mass and reduced inductance. In general, the reduced mass has a greater impact on sound pressure level than reduced inductance. The increased sound pressure level due to reduced mass is most significant at frequencies greater than 1 kHz, e.g., between 1 kHz and 20 kHz. The increased sound pressure level due to reduced inductance is most significant at frequencies greater than 5 kHz, e.g., between 5 kHz and 20 kHz.

In general, the disclosed actuators are controlled by an electronic control module, e.g., electronic control module 220 in FIG. 2 above. In general, electronic control modules are composed of one or more electronic components that receive input from one or more sensors and/or signal receivers of the mobile phone, process the input, and generate and deliver signal waveforms that cause actuator 210 to vibrate. For example, the electronic control module can be electrically coupled to the coil 304. The electronic control module can be programmed to energize the coil to couple vibrations to the panel to produce an audio or haptic response from the panel.

Figure 9:
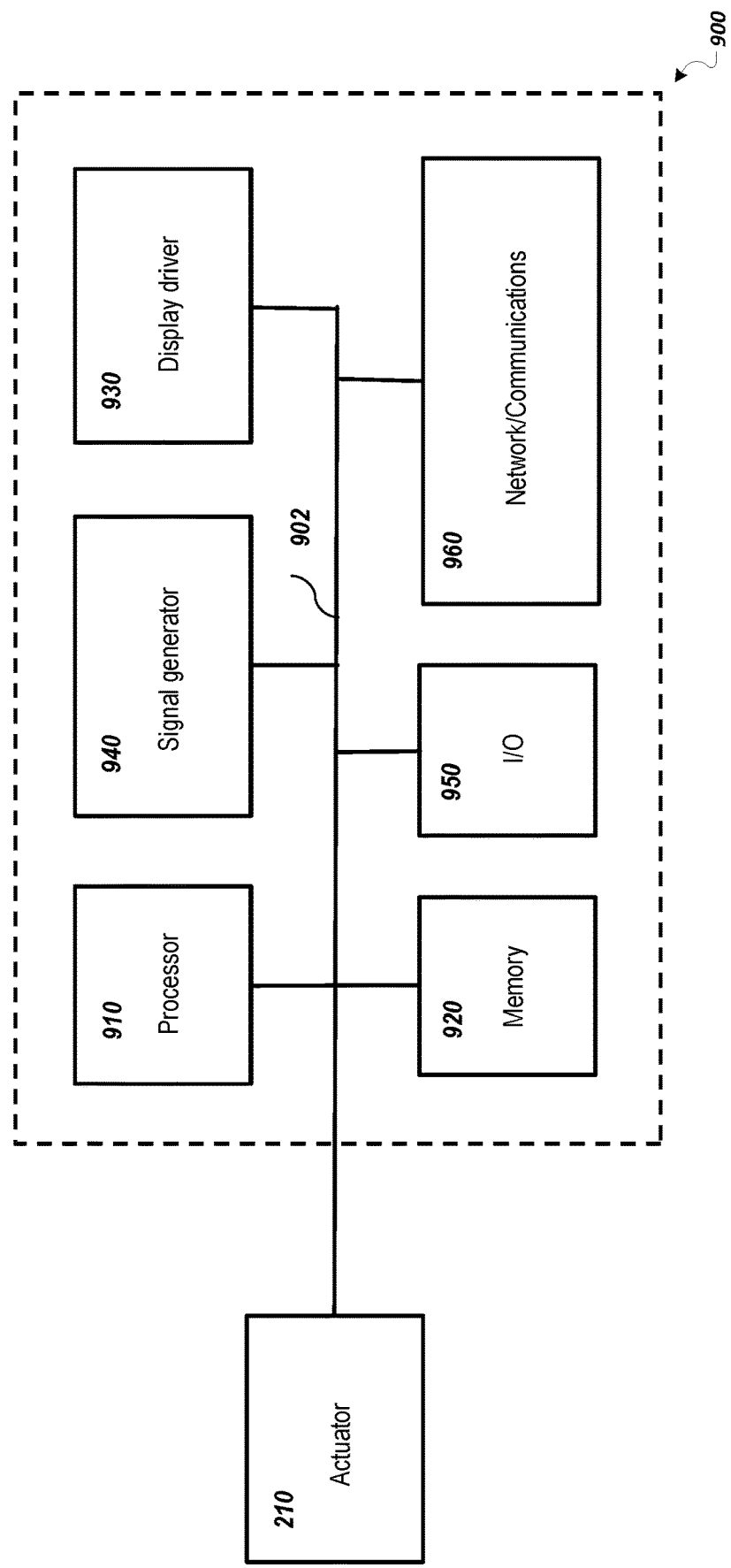
FIG. 9 is a schematic diagram of an embodiment of an electronic control module for a mobile device.

Referring to FIG. 9, an exemplary electronic control module 900 of a mobile device, such as mobile device 100, includes a processor 910, memory 920, a display driver 930, a signal generator 940, an input/output (I/O) module 950, and a network/communications module 960. These components are in electrical communication with one another (e.g., via a signal bus 902) and with actuator 210.

Processor 910 may be implemented as any electronic device capable of processing, receiving, or transmitting data or instructions. For example, processor 910 can be a microprocessor, a central processing unit (CPU), an application-specific integrated circuit (ASIC), a digital signal processor (DSP), or combinations of such devices.

Memory 920 has various instructions, computer programs or other data stored thereon. The instructions or computer programs may be configured to perform one or more of the operations or functions described with respect to the mobile device. For example, the instructions may be configured to control or coordinate the operation of the device's display via display driver 930, signal generator 940, one or more components of I/O module 950, one or more communication channels accessible via network/communications module 960, one or more sensors (e.g., biometric sensors, temperature sensors, accelerometers, optical sensors, barometric sensors, moisture sensors and so on), and/or actuator 210.

Signal generator 940 is configured to produce AC waveforms of varying amplitudes, frequency, and/or pulse profiles suitable for actuator 210 and producing acoustic and/or haptic responses via the actuator. Although depicted as a separate component, in some embodiments, signal generator 940 can be part of processor 910. In some embodiments, signal generator 940 can include an amplifier, e.g., as an integral or separate component thereof.

Memory 920 can store electronic data that can be used by the mobile device. For example, memory 920 can store electrical data or content such as, for example, audio and video files, documents and applications, device settings and user preferences, timing and control signals or data for the various modules, data structures or databases, and so on. Memory 920 may also store instructions for recreating the various types of waveforms that may be used by signal generator 940 to generate signals for actuator 210. Memory 920 may be any type of memory such as, for example, random access memory, read-only memory, Flash memory, removable memory, or other types of storage elements, or combinations of such devices.

As briefly discussed above, electronic control module 900 may include various input and output components represented in FIG. 9 as I/O module 950. Although the components of I/O module 950 are represented as a single item in FIG. 9, the mobile device may include a number of different input components, including buttons, microphones, switches, and dials for accepting user input. In some embodiments, the components of I/O module 950 may include one or more touch sensor and/or force sensors. For example, the mobile device's display may include one or more touch sensors and/or one or more force sensors that enable a user to provide input to the mobile device.

Each of the components of I/O module 950 may include specialized circuitry for generating signals or data. In some cases, the components may produce or provide feedback for application-specific input that corresponds to a prompt or user interface object presented on the display.

As noted above, network/communications module 960 includes one or more communication channels. These communication channels can include one or more wireless interfaces that provide communications between processor 910 and an external device or other electronic device. In general, the communication channels may be configured to transmit and receive data and/or signals that may be interpreted by instructions executed on processor 910. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 960 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the mobile device 100 to a mobile phone for output on that device and vice versa. Similarly, the network/communications module 960 may be configured to receive input provided on another device to control the mobile device. For example, an audible alert, visual notification, or haptic alert (or instructions therefor) may be transmitted from the external device to the mobile device for presentation.

The actuator technology disclosed herein can be used in panel audio systems, e.g., designed to provide acoustic and/or haptic feedback. The panel may be a display system, for example based on OLED of LCD technology. The panel may be part of a smartphone, tablet computer, or wearable devices (e.g., smartwatch or head-mounted device, such as smart glasses).

Other embodiments are in the following claims.

What is claimed is:
1. A panel audio loudspeaker comprising:
    an actuator module comprising:
        an intermediate layer extending in a plane, the intermediate layer having a first surface,
        a voice coil connected to the intermediate layer at the first surface, the voice coil defining a coil axis perpendicular to the plane, wherein the intermediate layer includes:
a printed circuit board, a base-plate, and a pressure sensitive adhesive; and
an aperture that is aligned with the voice coil in a direction perpendicular to the plane, wherein:
the aperture extends through the printed circuit board, the base-plate, and the pressure sensitive adhesive, or
the aperture extends through the printed circuit board and the base-plate, and the aperture does not extend through the pressure sensitive adhesive,
a magnet assembly comprising a plurality of magnets, wherein at least one pair of magnets of the plurality of magnets are separated by an air gap,
a frame connected to the intermediate layer at the first surface,
one or more springs connected to the frame and suspending the magnet assembly relative to the frame and intermediate layer so that the voice coil extends at least partially into the air gap, and
a spacer connected along a portion of the intermediate layer at a second surface of the intermediate layer opposite the first surface, wherein a stiffness of the spacer at a region of connection to the intermediate layer is less than a stiffness of the intermediate layer at the portion of the intermediate layer; and
a panel attached to the spacer.

2. The panel audio loudspeaker of claim 1, wherein the voice coil has a length and width in the plane that is substantially the same as a length and width of the spacer in the plane.

3. The panel audio loudspeaker of claim 2, wherein the voice coil is aligned with the spacer in a direction perpendicular to the plane at the portion of the intermediate layer to which the spacer is connected.

4. The panel audio loudspeaker of claim 1, wherein the pressure sensitive adhesive forms the second surface of the intermediate layer to which the spacer is connected.

5. The panel audio loudspeaker of claim 1, wherein:
the actuator module further comprises a ring of compliant material attached on a first side to the panel and on a second, opposite side to the second surface of the intermediate layer,
the ring of compliant material is parallel to the plane and coplanar with the spacer, and
the ring of compliant material surrounds the spacer.

6. The panel audio loudspeaker of claim 5, wherein the ring of compliant material is aligned with the frame or aligned with the frame and one or more magnets of the magnet assembly in a direction perpendicular to the plane.

7. The panel audio loudspeaker of claim 1, wherein the panel comprises a display panel.

8. The panel audio loudspeaker of claim 1, wherein the aperture is c-shaped, and the voice coil is attached to the intermediate layer at a portion of the intermediate layer between ends of the c-shaped aperture.

9. The panel audio loudspeaker of claim 1, wherein the aperture is o-shaped and separates an inner portion of the intermediate layer from an outer portion of the intermediate layer in the plane.

10. The panel audio loudspeaker of claim 9, further comprising:
a hood enclosing the magnet assembly and the voice coil in a space defined by the hood and the intermediate layer; and
a supporting member attached to the hood or to at least one of the plurality of magnets of the actuator module.

11. The panel audio loudspeaker of claim 1, wherein the aperture extends through the printed circuit board, the base-plate, and the pressure sensitive adhesive.

12. The panel audio loudspeaker of claim 1, wherein:
the aperture extends through the printed circuit board and the base-plate; and
the aperture does not extend through the pressure sensitive adhesive.

13. A mobile device, comprising:
a housing;
a panel audio loudspeaker comprising:
an actuator module comprising:
an intermediate layer extending in a plane, the intermediate layer having a first surface,
a voice coil connected to the intermediate layer at the first surface, the voice coil defining a coil axis perpendicular to the plane,
wherein the intermediate layer includes:
a printed circuit board, a base-plate, and a pressure sensitive adhesive; and
an aperture that is aligned with the voice coil in a direction perpendicular to the plane, wherein:
the aperture extends through the printed circuit board, the base-plate, and the pressure sensitive adhesive, or
the aperture extends through the printed circuit board and the base-plate, and the aperture does not extend through the pressure sensitive adhesive,
a magnet assembly comprising a plurality of magnets, wherein at least one pair of magnets of the plurality of magnets are separated by an air gap,
a frame connected to the intermediate layer at the first surface,
one or more springs connected to the frame and suspending the magnet assembly relative to the frame and intermediate layer so that the voice coil extends at least partially into the air gap, and
a spacer connected along a portion of the intermediate layer at a second surface of the intermediate layer opposite the first surface, wherein a stiffness of the spacer at a region of connection to the intermediate layer is less than a stiffness of the intermediate layer at the portion of the intermediate layer; and
a panel attached to the spacer; and
an electronic control module electrically coupled to the voice coil and programmed to energize the voice coil to couple vibrations to the panel to produce an audio response from the panel.

14. The mobile device of claim 13, wherein the mobile device is a mobile phone or a tablet computer.

15. The mobile device of claim 13, wherein the panel comprises a display panel.

16. A wearable device comprising:
a housing;
a panel audio loudspeaker comprising:
an actuator module comprising:
an intermediate layer extending in a plane, the intermediate layer having a first surface,
a voice coil connected to the intermediate layer at the first surface, the voice coil defining a coil axis perpendicular to the plane, wherein the intermediate layer includes:
- a printed circuit board, a base-plate, and a pressure sensitive adhesive; and
- an aperture that is aligned with the voice coil in a direction perpendicular to the plane, wherein:
  - the aperture extends through the printed circuit board, the base-plate, and the pressure sensitive adhesive, or
  - the aperture extends through the printed circuit board and the base-plate, and the aperture does not extend through the pressure sensitive adhesive, a magnet assembly comprising a plurality of magnets, wherein at least one pair of magnets of the plurality of magnets are separated by an air gap, a frame connected to the intermediate layer at the first surface, one or more springs connected to the frame and suspending the magnet assembly relative to the frame and intermediate layer so that the voice coil extends at least partially into the air gap, and a spacer connected along a portion of the intermediate layer at a second surface of the intermediate layer opposite the first surface, wherein a stiffness of the spacer at a region of connection to the intermediate layer is less than a stiffness of the intermediate layer at the portion of the intermediate layer; and a panel attached to the spacer; and an electronic control module electrically coupled to the voice coil and programmed to energize the voice coil to couple vibrations to the panel to produce an audio response from the panel.

17. The wearable device of claim 16, wherein the wearable device is a smart watch or a head-mounted display.

18. The wearable device of claim 16, wherein the panel comprises a display panel.

* * * * *